US008411080B1

(12) United States Patent
Zimmermann

(10) Patent No.: US 8,411,080 B1
(45) Date of Patent: Apr. 2, 2013

(54) APPARATUS AND METHOD FOR EDITING THREE DIMENSIONAL OBJECTS

(75) Inventor: Johannes Zimmermann, Berlin (DE)

(73) Assignee: Disney Enterprises, Inc., Burbank, CA (US)

( * ) Notice: Subject to any disclaimer, the term of this patent is extended or adjusted under 35 U.S.C. 154(b) by 815 days.

(21) Appl. No.: 12/147,445

(22) Filed: Jun. 26, 2008

(51) Int. Cl.
*G06T 15/00* (2011.01)
*G06T 17/00* (2006.01)
*G06T 11/20* (2006.01)

(52) U.S. Cl. .................. 345/419; 345/420; 345/441

(58) Field of Classification Search .................. 345/199, 345/200, 209, 419–420; 382/103, 154, 174, 382/182, 199, 204, 426
See application file for complete search history.

(56) References Cited

U.S. PATENT DOCUMENTS

| 6,795,069 B2 * | 9/2004 | Raskar et al. ................. 345/419 |
| 2005/0017969 A1 * | 1/2005 | Sen et al. ...................... 345/419 |
| 2009/0116728 A1 * | 5/2009 | Agrawal et al. ............... 382/154 |
| 2009/0284550 A1 * | 11/2009 | Shimada et al. .............. 345/619 |

OTHER PUBLICATIONS

Rafael Gonzalez and Richard Woods, "Digital Image Processing", Sep. 1993, Addison-Wesley Publishing Company, Inc. pp. 420, 432.*
Robert M. Haralick, "Digital Step Edges from Zero Crossing of Second Directional Derivatives", Jan. 1984, IEEE Transactions on Pattern Analysis and Machine Intelligence, vol. PAMI-6 No. 1, p. 58-68.*
K. Pulli and M. Pietikainen, "Range Image Segmentation Based on Decomposition of Surface Normals," Proceediing of 8th Scandinavian Conference on Image Analysis, vol. 2, pp. 893-899, 1993.*
Ramakant Nevatia, and K. Ramesh Babu, "Linear Feature Extraction and Description," Computer Graphics and Image Processing, 12, 257-269, 1980.*
Theo Pavlidis, and Yuh-Tay Liow, "Integrating Region Growing and Edge Detection," IEEE Transactions on Pattern Analysis and Machine Intelligence, vol. 12, No. 3, pp. 225-233, Mar. 1990.*
Olga Sorkine, Danel Cohen-Or, Yaron Lipman, and Marc Alexa, "Laplacian Surface Editing," SIG'04 Proceedings of the 2004 Eurographics/ACM SIGGRAPH symposium on Geometry Processing, pp. 175-184, 2004.*
Aaron Hertzmann, "Introduction to 3D Non-Photorealistic Rendering: Silhouettes and Outlines", In Stuart Green, editor, Non-Photorealistic Rendering, SIGGRAPH Course Notes, 1999.*
Zhiyuan Zhao and Alan Saalfeld, "Linear-Time Sleeve-Fitting Polyline Simplification Algorithms", AutoCarto 13, Seattle, Washington, 1997, pp. 24-223.*
Zimmermann, Johannes, "MeshSketch: Automated, Sketch-Based Editing of Triangular Meshes", Technische Universität Berlin, Berlin, Germany, 60 pages, Jun. 28, 2007.

(Continued)

*Primary Examiner* — Kee M Tung
*Assistant Examiner* — Sing-Wai Wu
(74) *Attorney, Agent, or Firm* — Dorsey & Whitney LLP

(57) ABSTRACT

A computer graphic editing or modeling system that automatically alters a computer graphic object based on a user sketch. The computer graphic object may be presented as an image space view of the object (proxy). The sketch is placed in proximity to some feature of the image space view. The system matches the sketch with the feature taking into account silhouettes, which may be derived by way of depth continuity and depth gradient similarity, of the object and matching the silhouette with the feature based on proximity and shape. The matched handle silhouette is transformed to associated handle vertices of a mesh of the graphic object. The system may then deform the mesh based on the user sketch by obtaining a dimensional relationship between the user sketch and the associated silhouette and applying the dimensional relationship to a region of interest, which includes the handle vertices.

20 Claims, 14 Drawing Sheets

OTHER PUBLICATIONS

Botsch et al., "PriMo: Coupled Prisms for Intuitive Surface Modeling," Eurographics Symposium on Geometry Processing, 10 pages, 2006.

Boulanger et al., "Detection of Depth and Orientation Discontinuties in Range Images Using Mathematical Morphology," IEEE, pp. 729-732, 1990.

Canny, John, "A Computational Approach to Edge Detection," IEEE Transactions on Pattern Analysis and Machine Intelligence, vol. PAMI-8, No. 6, pp. 679-698, Nov. 1986.

Cohen et al., "Partial Matching of Planar Polylines Under Similarity Transformations," Eighth Annual ACM-SIAM Symposium on Discrete Algorithms, pp. 777-786, Jan. 1997.

DeCarlo et al., "Suggestive Contours for Conveying Shape," In SIGGRAPH, 8 pages, 2003.

Douglas et al., "Algorithms for the Reduction of the Number of Points Required to Represent a Digitized Line or Its Caricature," The Canadian Cartographer, vol. 10, No. 2, pp. 112-122, Dec. 1973.

Edelsbrunner et al., "Topologically Sweeping an Arrangement," Systems Research Center, 42 pages, Apr. 1, 1986.

Edelsbrunner et al., "Topologically Sweeping an Arrangement," Journal of Computer and System Sciences, vol. 38, No. 1, pp. 165-194, Feb. 1989.

Hahne, Uwe, "Weighting in Laplacian Mesh Editing," http://www.cg.tu-berlin.de/fileadmin/webdav/hahne/diploma/diploma.pdf, 87 pages, May 2006.

Hertzmann, Aaron, "Introduction to 3D Non-Photorealistic Rendering: Silhouettes and Outlines," Media Research Laboratory, Department of Computer Science, New York University, 14 pages, at least as early as Jun. 26, 2008.

Hoffman et al., "Salience of visual parts," Elsevier Cognition 63, vol. 63, pp. 29-78, 1997.

Hoover et al., "An Experimental Comparison of Range Image Segmentation Algorithms," pp. 1-42, at least as early as Jun. 26, 2008.

Igarashi et al., "Teddy: A Sketching Interface for 3D Freeform Design," ACM SIGRAPH 99, 8 pages, at least as early as Jun. 26, 2008.

Ji et al., "Easy Mesh Cutting," Eurographics, vol. 25, No. 3, 9 pages, 2006.

Kara et al., "Sketch-Based 3D-Shape Creation for Industrial Styling Design," IEE Computer Society, pp. 60-71, Jan./Feb. 2007.

Katz et al., "Hierarchical Mesh Decomposition Using Fuzzy Clustering and Cuts," 8 pages, at least as early as Jun. 26, 2008.

Kho et al., "Sketching Mesh Deformations," University of Illinois at Urbana-Champaign, 8 pages, at least as early as Jun. 26, 2008.

Knuth, Donald E., "Don Knuth's Home Page," Stanford Computer Science Home Page, 2 pages, at least as early as Jun. 26, 2008.

Kraevoy et al., "Contour-based Modeling Using Deformable 3D Templates," University of British Columbia, 9 pages, at least as early as Jun. 26, 2008.

Lee et al., "Morphologic Edge Detection," IEEE Journal of Robotics and Automation, vol. RA-3, No. 2, 15 pages, Apr. 1987.

Lipman et al., "Differential Coordinates for Interactive Mesh Editing," pp. 1-8, at least as early as Jun. 26, 2008.

Nealen et al., "A Sketch-Based Interface for Detail-Preserving Mesh Editing," 6 pages, at least as early as Jun. 26, 2008.

Petkov et al., "Canny Edge Detector (Canny Filter) for Image Processing and Computer Vision," http://matlabserver.cs.rug.nl/cannyedgedetectionweb/web/index.html, 1 page, at least as early as Jun. 26, 2008.

Peters, II, Richard Alan, "EECE/CS 253 Image Processing," Lecture Notes on Mathematical Morphology: Binary Images, Department of Electrical Engineering and Computer Science, 57 pages, Fall Semester 2007.

Pulli et al., "Range Image Segmentation Based on Decomposition of Surface Normals," Computer Laboratory, Department of Electrical Engineering, University of Oulu, 7 pages, at least as early as Jun. 26, 2008.

Sorkine et al., "Laplacian Surface Editing," 10 pages, at least as early as Jun. 26, 2008.

Yu et al., "Mesh Editing with Poisson-Based Gradient Field Manipulation," ACM SIGGRAPH, 8 pages, 2004.

Zimmermann et al., "SilSketch: Automated Sketch-Based Editing of Surface Meshes," Eurographics Workshop on Sketch-Based Interfaces and Modeling, 8 pages, 2007.

\* cited by examiner

US 8,411,080 B1

APPARATUS AND METHOD FOR EDITING THREE DIMENSIONAL OBJECTS

FIELD OF THE INVENTION

Aspects of the present invention involve an apparatus and method for editing three dimensional objects.

BACKGROUND

The process of altering three dimensional (3D) computer graphic models (objects) often involves a person sketching a proposed alteration on a print of the graphic. A model developer then reviews the sketched alteration and then manually alters the graphic shape in a graphic modeling program. The process tends to involve iterative design reviews, with additional sketch alteration and manual graphic manipulation.

Software developers, animation engineers, and many others have developed numerous applications to automate many aspects of the process. For example, there are programs that allow a user to manually select, within a user interface, a feature of a computer graphic object that the user seeks to alter. For example, the user may draw a line over the feature or otherwise manually select the feature that the user seeks to alter. The user then enters a second line in the user interface where the feature selected by the first line is altered pursuant to the second line. While certainly an advancement in the art, the program requires the user to manually select the feature to alter before the user then enters the alteration of the feature. Other similar advancements in the art also require some level of manual interaction with the feature that the user intends to alter before the user can alter the feature.

SUMMARY

One aspect of the invention may involve a method of preparing a three dimensional computer graphic object for deformation. The method comprises receiving a user generated sketch proximate a feature of a two dimensional view of a three dimensional computer graphic object. The method then matches the user generated sketch with the feature of the two dimensional view. And, the method includes transforming the matched feature of the two dimensional view to a representation of the feature associated with the three dimensional computer graphic object.

Another aspect of the invention may involve a method of deformation a computer graphic object comprising. The method comprise providing a proxy image of the computer graphic object, the proxy image including a plurality of image features. A user may edit the object by way of sketching. Hence, the method receives a user generated sketch proximate at least one of the image features. The method then identifies at least one of the image features of the plurality image values of the proxy image by matching the user generated sketch with the at least one image feature. Finally, the method transforms the feature image values of the proxy image to corresponding object feature values of the computer graphic object.

Yet another aspect of the invention may involve a graphic processing computing system including one or more processors with access to memory storing a computer graphic object. The system may provide a user interface for accessing the graphic processing system, the user interface providing a proxy image of the computer graphic object. The graphic processing computing system configured to perform the operations of the various methods set forth herein.

These and other advantages, aspects and features of the present disclosure will become apparent to those of ordinary skill in the art upon reading this disclosure in its entirety.

DETAILED DESCRIPTION

Aspects of the present disclosure involve an apparatus and methods for altering some aspect of a three dimensional computer graphic object, and otherwise preparing such an object for alteration. In one implementation, by way of a user interface providing a proxy view of the three dimensional computer graphic object, a user may sketch a suggested alteration in some relative position to the proxy view of the three dimensional computer graphic object, and the implementation will automatically detect the feature of the three dimensional object that is meant to be altered, and will then automatically alter the feature consistent with the sketched input. The proxy view may be a two dimensional pixel based representation of the object, with the pixels having associated depth information. The pixels may be gray scale or color.

Initially, the sketched alteration, also referred to as a target polyline, is matched with a silhouette (or portion thereof) of the proxy image. The sketch and silhouette may both be in two dimensional space. The matched silhouette, also referred to and in the form of a handle polyline, is then mapped to vertices (handle vertices) in the three dimensional mesh of the computer graphic object. At this point, manipulation and computations in two dimensional space are transformed to three dimensional space.

In three dimensional space or "object space," the handle vertices are mapped to the sketch to define a region of interest of the mesh for the object being altered. The region of interest, representing an area of the three dimensional object proportional to the transformation between the handle vertices and the sketched area, is then used by a Laplacian surface editing function to deform the object. Accordingly, upon entering a user sketch approximate some feature of a three dimensional object, implementations set out herein, select the feature of the object to be altered, determine the form of alteration, and alter the feature.

Figure 1:
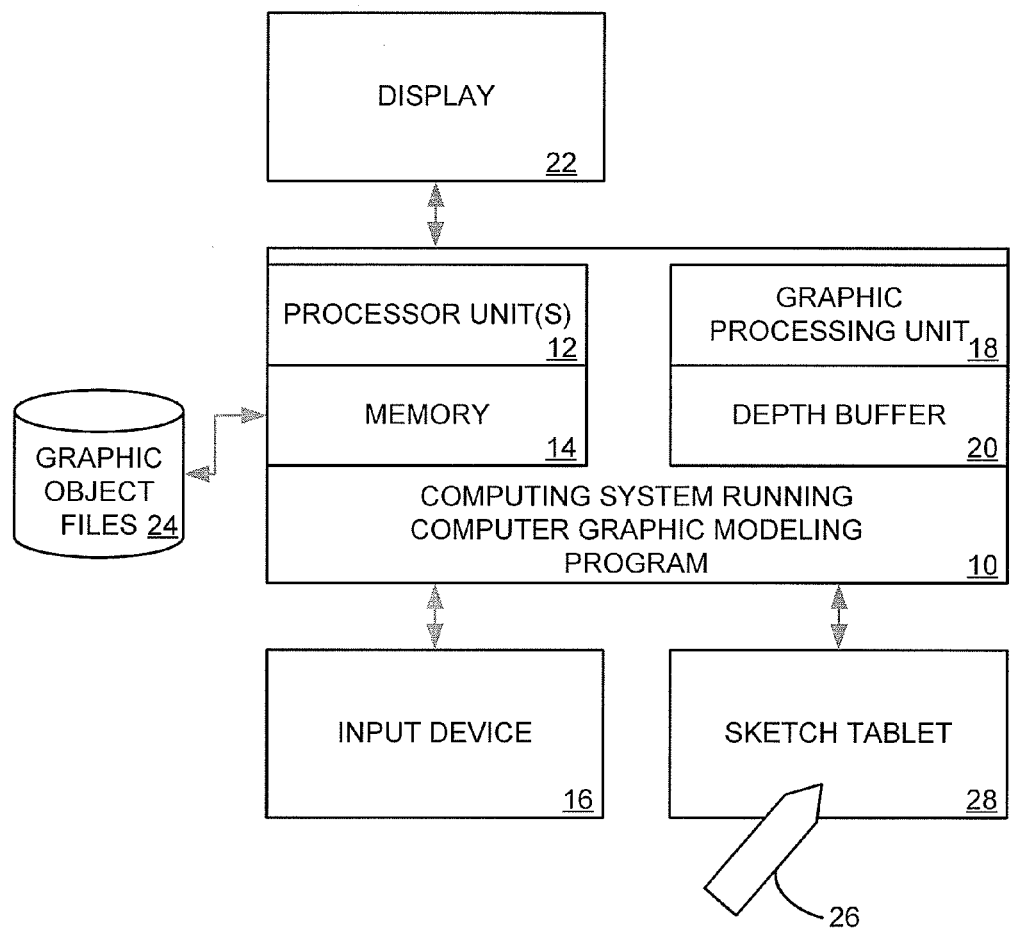
FIG. 1 is a block diagram of a computing system executing a computer graphic modeling program configured in accordance with aspects of the present disclosure.

FIG. 1 illustrates a system diagram of one possible computing platform 10 suitable to implement aspects of the present disclosure. A three dimensional object (3D object) is first provided with a three dimensional modeling or graphics software platform, such as zBrush, Maya, Pro/Engineer, SolidWorks, AutoCAD, or the like. Such programs run on some form of computing platform that may include one or more processors 12, cache memory and other tiers of memory 14, various possible interface mediums (e.g., mouse, keyboard, etc.) 16, one of or more graphic processing units 18 (e.g. Nvidia™ 7x00 series GPU with Forcewall 93.71 drivers) with a depth buffer 20 and a display 22. It is also possible that the computing platform 10 will further include access to a database 24 or other large size memory where the computer graphic object files are stored. The terms "system" or "editing system" are used herein to refer to some form of computing system, such as that shown in FIG. 1, computer graphic program, or the like, altered and configured in accordance with various methods and computations set forth herein. Methods and computations set forth herein may be implemented using OpenGL and Qt on a Microsoft™ Windows™ platform, or other suitable platforms.

To facilitate sketching some alteration of the object, the computing platform may further include an electronic pen 26 (also referred to as a stylus) and a digitized tablet 28 and/or interactive display that allow a user to generate an input into the program with the pen in a manner similar to conventional pen and paper sketching. The 3D object is stored in memory in the form of a polygon mesh as a graphic file that contains at least the geometry of a mesh (vertex positions and vertex connectivities), and may contain additional information on materials and/or other attributes of the object. The mesh-based representation of 3D objects usually implies the use of object-relative 3D coordinates that refer to the "object space". The mesh is a collection of polygons including vertices, edges running between vertices, and faces between the edges. One particular mesh form is a triangular mesh, whose faces are triangular polygons (triangles). The collection of triangles making up the mesh define the outer shape of the 3D object and are used to render the object on a display in two dimensional form. Aspects of the present invention may be employed with graphic objects including various possible types of meshes. The display may be of the computing platform running the modeling application or a display of a computing device executing some form of application (video game, animation, motion picture, etc.) that has incorporated the object and is displaying the object.

Figure 2:
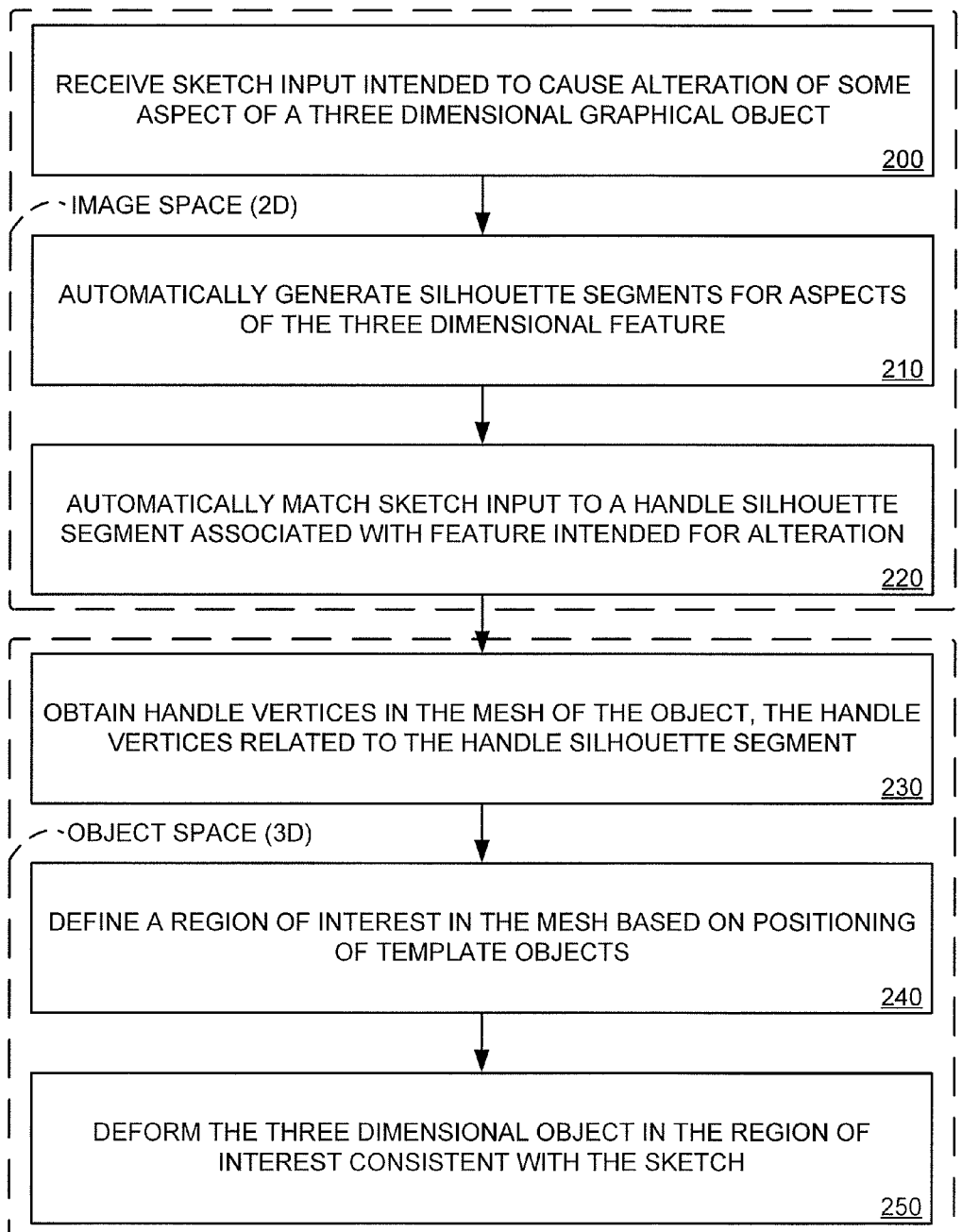
FIG. 2 is a flow chart illustrating a method of receiving a user sketch into the computer graphic modeling program and automatically deforming a computer graphic object.

FIG. 2 illustrates one method of altering a three dimensional computer graphic file. Various operations set forth in the method of FIG. 2 are discussed with reference to FIGS. 3A-3F as well as other figures. FIG. 3A-3F are two dimensional views of a three dimensional computer graphic object for a rabbit 32, where the rabbit object is shown in an unaltered state (FIG. 3A) and proceeding through various stages of editing a facial feature 34 of the rabbit to the final altered view of the rabbit (FIG. 3F).

To deform a computer graphic object, a user begins by electronically sketching or otherwise entering a line in the vicinity of some portion of a three dimensional graphic object (operation 200). In the specific example of FIG. 3B, a user has sketched a line 36, with an input device 16, such as a mouse, stylus 26, etc., above a facial area 38 of the rabbit object. The user may sketch the line into a graphics, computer modeling, etc., program configured in accordance with aspects of this disclosure. Generally speaking, the sketch input, whether straight line, curved line, etc., is entered in proximity to some existing object feature the user seeks to edit, deform or otherwise alter The sketch as well as the view and object representation (proxy view) are in image space. In the example of FIG. 3B, the user has sketched the slightly curved 36 line above the facial feature 38 of the rabbit 32 in an effort to alter the shape of the rabbit from a rounded face as shown in FIGS. 3A through 3D, to a more pointed face 34 as shown in FIGS. 3E and 3F. The sketched input may be stored as a collection of tracked mouse events (a collection of pixel locations that the mouse passed over on the display, for example) in the case of a user employing a mouse for an input to the system. The collection of tracked mouse events may be considered a polyline, which is a string of image space coordinates or points, and may be referred to herein as a "sketch polyline" or "target polyline." Points of silhouette polylines have positional attributes (X, Y), along with an associated depth attribute. The points of a sketch polyline may have two dimensional positional attributes (X, Y), and may also have a timestamp, and additional attributes such as the pressure applied by the stylus at a given sketch polyline position. The complexity of the target polyline may be reduced by removing some points, one such method discussed below with regard to silhouette polylines. Reducing complexity of the polylines may improve the time for a target polyline to match to a silhouette polyline.

To begin processing the sketched input, the system may generate silhouettes of the object (operation 210). One implementation generates a silhouette based on analysis of discontinuities in a depth map of the object. Besides representing the 3D object as an object space mesh, the 3D object may also be represented in image space, which is a projection of the 3D object into a two dimensional color or grayscale map and an associated depth map. Silhouettes are derived with respect to the two dimensional representation of the graphic object, and particularly may be described with the particular two dimensional representation of the graphic object of the view the user entered the sketch. Typically, many silhouettes for the graphical object are generated. Later in processing one particular silhouette, portion of a silhouette, or combination of silhouettes or portions thereof, is/are matched with the target polyline.

The color map is a collection of pixel values for the object with each pixel having a value associated with the color for the pixel. Grey scale maps are similar to color maps and may also be involved with implementations set forth herein, in grey scale the pixel values are related to grey scale ranging from white through shades of grey to black. The depth map is a collection of depth values for each pixel. Depth values may range between decimal values of 0 to 1, with 1 representing a portion of the image at the deepest background of the image and 0 represent a portion of the image at the nearest foreground portion of the image, for example. It will be appreciated that the color, grey scale, and depth maps may be presented in binary form, and may at some point be compressed.

Figure 3:
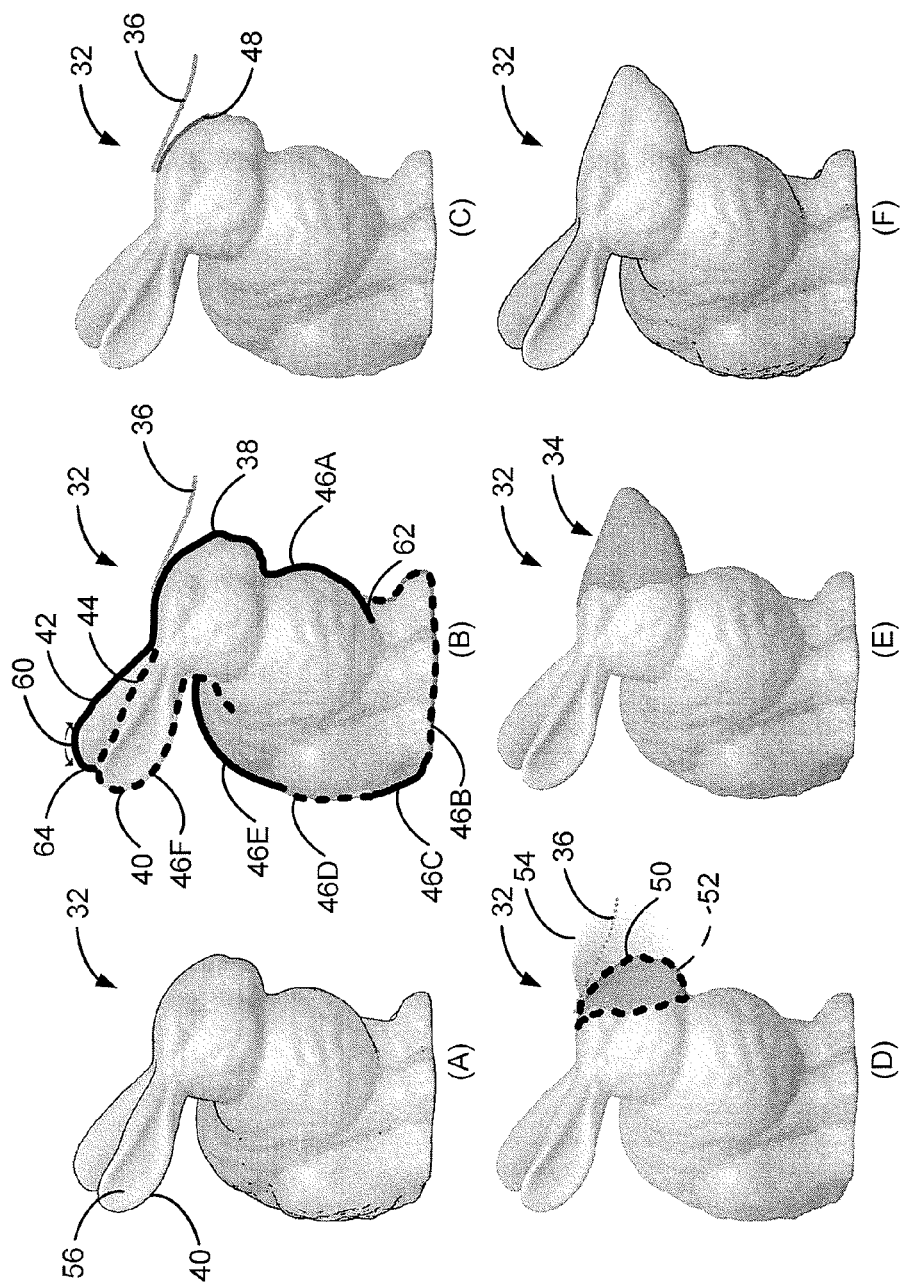
FIGS. 3A-3F illustrate image view diagrams of a computer graphic object for a rabbit being edited in accordance with aspects of the present disclosure, noting that the image diagram of FIG. 3D is discussed with reference to object space alterations.

The depth map is analyzed to locate discontinuities in the depth map where the discontinuities represent edges between features. A given silhouette is an outline of some feature of the object defined by a discontinuity in the depth map. Hence, silhouette(s) of the object are generated based on discontinuities in the depth map. For example, there is a discontinuity between the facial area 38 of the rabbit and a background of the image, there is a discontinuity around both ears 40, 42 of the rabbit and the background of the image as well as a discontinuity 44 where the ears overlap (the ear in the foreground compared to the ear in the background), etc. In FIG. 3, the background of the image is simply the white area around the rabbit. In these examples, the depth values for the background and the face of the rabbit as well as the background ear of the rabbit are appreciably different, the depth values between the foreground and background ear, however, may be less appreciably different. Any given object, or more specifically two dimensional view of an object, may have a number of silhouettes 46A-46F, as shown in FIG. 3B.

The silhouette may be represented by a set or sets of image-space polylines. A polyline includes a set of pixels, not necessarily adjacent, that when connected represent a silhoutte line. Silhouettes may be represented by varying polyline representations, with more or less pixels, in order to speed processing, as discussed further below. The silhouette polylines may be in two dimensional space, with each pixel of the polyline defined by an x and y value.

Still referring to FIG. 2, to properly alter the correct feature of the object, the sketch is matched to the silhouette for the portion of the object meant to be altered by the sketch (operation 220). The sketch, as mentioned above, is also in two dimensional space, where each pixel of the sketch may also be defined by an x and y value. The sketch may be matched at one or more locations on a given silhouette polyline. Such matching may also be referred to as "handle estimation." As will be understood from the discussion below, a portion of a given silhouette polyline that is matched to the target polyline may be referred to as a "handle polyline." Hence, for example, a silhouette portion 48 (FIG. 3C) of the silhouette 38 (FIG. 3B) along the top portion of the rabbit's facial feature is matched to the sketch. The matched portion of the silhouette is a handle polyline. In one particular implementation, the user sketch is matched to the correct polyline (silhouette segment) by matching the shape of the sketch with the shape of a silhouette and also considering proximity of the sketch to the silhouette. Hence, for example, the user sketch is similar in shape to the rabbit's facial feature 38, as well as the back and chest area of the rabbit. However, of the three possible matches, the facial area 38, and particularly the silhouette portion 48, is nearest and hence is matched to the sketch.

The matching silhouette segment then allows the system to retrieve one or more handle vertices from the mesh of the three dimensional object (operation 230). The handle vertices are a subset of all vertices located in the area of the mesh associated with the handle silhouette. Hence, the user inputs a sketch adjacent a two dimensional representation of the feature and the sketch is matched in two dimensional space (the handle silhouette). The match in two dimensional space is then translated or otherwise transformed to a match in three dimensional space. Hence, mesh vertices, or "handle vertices", are identified in a portion of the mesh associated with the handle silhouette from two dimensional space.

Following the handle estimation, the system obtains a region of interest (ROI) for the deformation of the object based on the sketch (operation 240). Referring to FIG. 3D, the ROI 52 includes the collection of vertices associated with the area of the face of rabbit denoted by dashed line. Taking into account the displacement between the sketch input and the feature of interest of the object, one or more template/stencil objects are positioned on the object. In one example, the template objects are positioned relative to the handle vertices. FIG. 3D is conceptually presented as a view of the mesh of the rabbit 32. Handle vertices 50 are shown in the mesh view relative to the position of the handle polyline 48 in FIG. 3D.

The mesh for the object is then deformed consistent with the positioning and size of the three dimensional template/stencil objects (operation 250). In the examples of FIGS. 3D-3F, one or more sphere template objects 54 are positioned along the handle vertices 50 as shown in FIG. 3D. The size of the spheres is based on displacement between the handle vertices 50/handle polyline 48 and the target polyline (user sketch 36). The mesh of the object 52 in the area of the template object is then deformed consistently with the sketch input (FIG. 3E) using a Laplacian transformation, or other alteration platform, with the final alteration of the rabbit shown in FIG. 3F.

Other possible template objects are possible, such as a tube aligned with the viewing direction (depth direction of a two dimensional view). The tube would include a radius capturing handle vertices.

Figure 4:
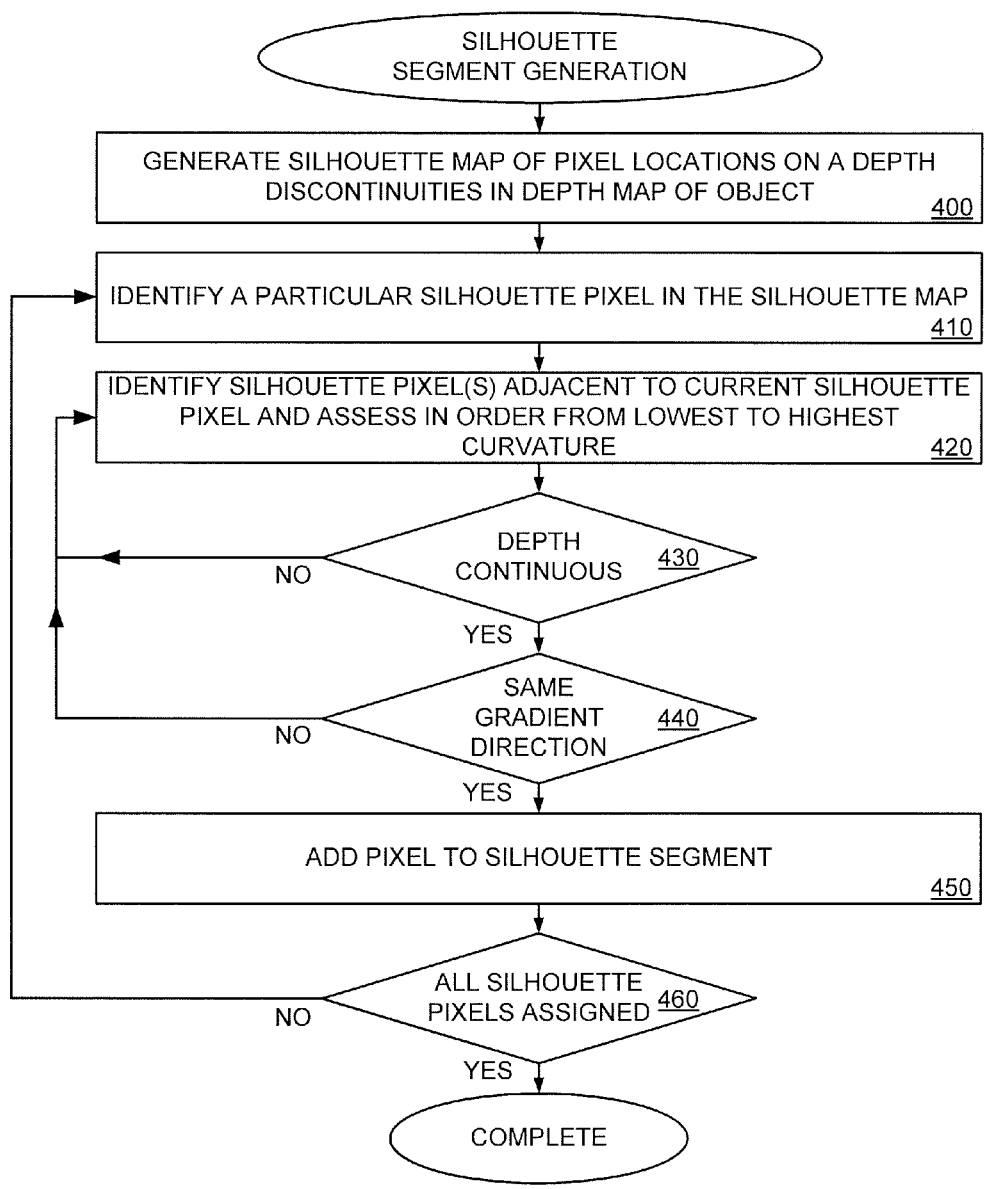
FIG. 4 is a flow chart illustrating a method of generating silhouette segments for an image view of a computer graphic object.

FIG. 4 illustrates a method of assessing silhouettes of the object to generate a collection of silhouette polyline segments where a particular silhouette polyline segment or portion thereof is used in comparison with the sketch line to automatically edit the three dimensional object, without further input by the user, in one particular implementation. As mentioned above, the polyline silhouette segments may be based on discontinuities in a depth map of a projection of the three dimensional object (operation 400). Generally speaking, the depth discontinuity method may exploit the properties of a synthetic scene, or graphical object to speed up processing as set out herein, rather than relying on well established methods like the Canny edge detector or morphological operations. Cany edge detection is discussed in "A computational approach to edge detection," by John Cany, *IEEE Trans. Pattern Anal. Mach. Intell.*, 8(6): 679, 698 (1986), which is hereby incorporated by reference herein. The outer silhouette of the object, the boundary between the background or scene and the object, is relatively easy to detect through various possible means. Areas where object features overlap, such as the discontinuity 44 between the foreground ear of the rabbit and the background ear of the rabbit, however, are more difficult to accurately detect. The silhouette, unlike some conventional implementations, is in image space as opposed to conventional object space silhouettes where a given silhouette involves a sequence of mesh edges. It is noted that the Canny Algorithm might be employed to generate a silhouette, however, in some experiments it was shown that use of the Canny algorithm resulted in some disconnected silhouettes and was hence not optimal.

Generation of the silhouette is based, at least in part, on the concept of edge detection in the depth map of the graphical object. Referring to FIG. 3A, for example, for some features, such as a surface 56 of the ear 40, there are gradual or continuous changes in the depth map values across the surface of the ear. At a boundary of the ear, there are discontinuities or non-continuous changes in the depth map value between the ear and whatever feature is adjacent the ear, such as a discontinuity between at the boundary 44 between the ear in the foreground and the ear in the background.

In one particular implementation, the silhouettes are generated from the depth values for two dimensional view of the object. The silhouette map for the object is determined by identifying discontinuities in the depth map using a 4-neighborhood Laplacian edge detection filter on each pixel ($p_n$) in the depth map along with a threshold $\theta_p$:

$$\text{sil}(p):=L_{xy}[\text{depth}(p)]>\theta_p$$

The sil(p) equation identifies each pixel on a silhouette line (located on a discontinuity). $L_{xy}$ is a 4-neighborhood Laplacian edge detection filter, depth(p) is the depth value for each pixel in the object image (or the entirety of the image space), and $\theta_p$ is the threshold value. The discrete Laplace filter is an edge detection operator that computes an approximation of the local $2^{nd}$ derivative (Laplacian) of image values:

$$L_{xy} = \begin{bmatrix} 0 & 1 & 0 \\ 1 & -4 & 1 \\ 0 & 1 & 0 \end{bmatrix}$$

In one particular implementation, the depth range of the image is mapped to [0, 2], while the object's bounding box is scaled to have unit diagonal and centered at unit distance. With these values, $\theta_p \approx 0.01$ may be a good choice to retrieve a binary image, or silhouette map, including silhouettes values of satisfying quality. Each pixel in the silhouette map is referred to as a silhouette pixel.

One factor to consider when choosing the $\theta_p$ value is the continuousness of the silhouette lines. A continuous silhouette path is one without improper breaks in the silhouette lines. One example of an improper break is a silhouette where there a gap or space between silhouette pixels where there should not be; hence, there should be adjacent pixels along x and y locations of the silhouette, but an adjacent pixel was not identified. Another factor to consider when choosing a $\theta_p$ value is the width of the silhouette, and wherever possible keeping the silhouette not more than one pixel wide. If the value of $\theta_p$ is set too high, there can be too many breaks in the silhouette whereas too low a $\theta_p$ value can cause undo blurring (silhouette lines more than one pixel wide). Hence, improper breaks in the silhouette paths and/or the silhouette path being more than one pixel wide can cause subsequent operations to be less accurate. For example, later operations discuss determining pixels to include a particular silhouette when silhouettes merge, for example, which decisions are prone to error and less accurate when a given silhouette is more than one pixel in width.

At this point in the processing of the depth data, the system has generated a silhouette map including a collection of pixels that are identified as silhouette pixels. The silhouette pixels are a subset of all pixels in the depth map. Hence, the sil(p) equation generates a pixel map of pixel values on a depth discontinuity (pixels that are part of some silhouette). The silhouette may include some pixels, albeit a relatively small number that may vary depending on the $\theta_p$ value, that are adjacent a discontinuity may not include some pixel values on the discontinuity and may have some spurious values.

Next, the processing proceeds to generating discrete pixels to associate with a particular silhouette (operation 410). So, for example, when the silhouette pixels of the rabbit are identified (at least for the view in which the sketch line was entered), the following operations will generate silhouette segments that each are a subset of all of the silhouette pixels, where each silhouette segment is related to some feature of the rabbit or portion of a feature for the rabbit, such as the foreground ear and background ear. From one perspective, a silhouette segment includes various pixels from the silhouette map that are concatenated to form image-space polylines representative of the silhouette of a feature of the rabbit.

Figure 5A:
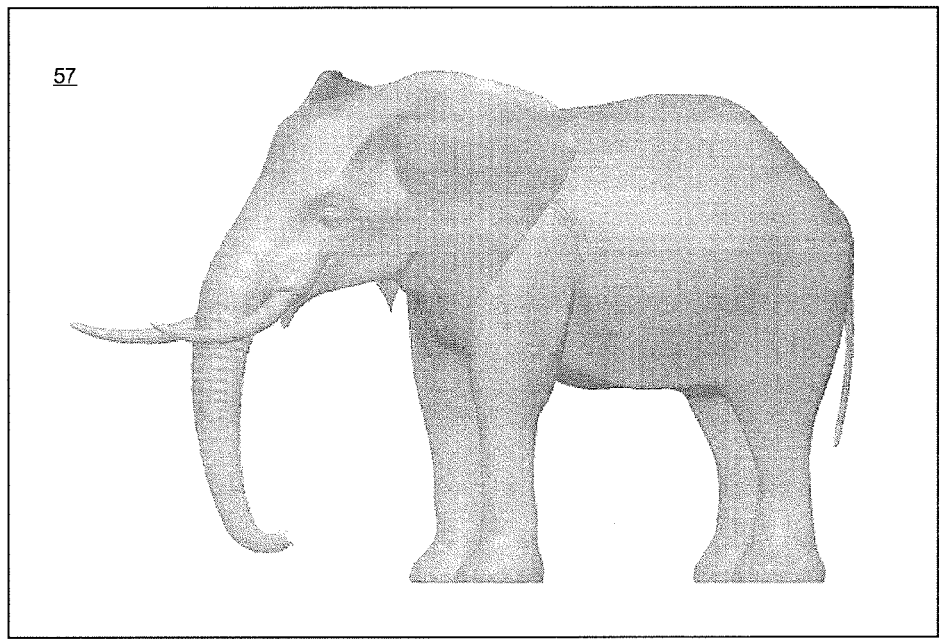
FIG. 5A is a diagram of an image view of an elephant object.
Figure 5B:
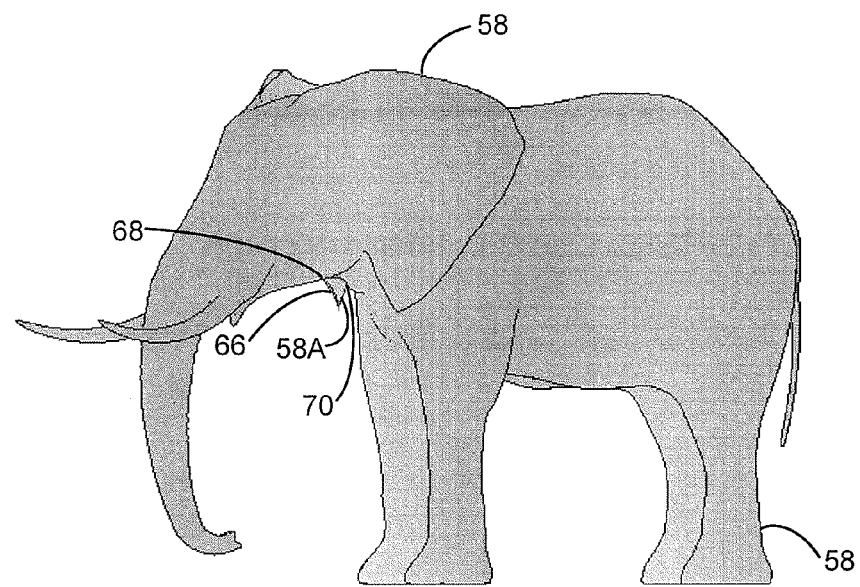
FIG. 5B is a diagram illustrating a silhouette map of the elephant image view of FIG. 5.

FIG. 5A is an image 57 of a gray scale pixel map for an elephant. FIG. 5B is a corresponding silhouette map for the elephant; note, the internal uniform gray value of the elephant is merely to emphasize the distinction between the background of the image and the silhouette lines, identified as black lines 58, but is not part of the silhouette map. (Note, not all silhouette lines are labeled in FIG. 5B) The silhouettes for the elephant are discussed in more detail with respect to operations set forth below, and with reference to FIGS. 7-10.

The silhouette map, like the depth map, is organized by row and column, and silhouette extraction, i.e., generating silhouette segments, may initially proceed with analyzing the map to identify a silhouette pixel, from which subsequent operations will proceed. In one implementation, the analysis may proceed along each row (e.g., from left to right, column by column along each row) and from top to bottom (e.g., beginning with the top row, completing a row, and proceeding down to the next row) until a silhouette pixel is identified. Irrespective of the manner of assessing the silhouette map to identify a silhouette pixel, the first silhouette pixel represents a starting point for generating the first silhouette segment or polyline of concatenating pixel values.

In one particular implementation, there may be four criterion considered in assigning a pixel to a silhouette segment: (1) adjacent pixel (neighbor), (2) curvature in image space, (3) depth continuous, and (4) direction of the depth map gradient with respect to the current tracing direction. These criteria may be considered in different orders and given different weight, and/or some criteria may be eliminated depending on the particular implementation.

From one perspective, once a silhouette pixel is identified, adjacent pixels are analyzed (operation 420) to determine if they are part of the same silhouette segment as the first pixel, and if they are part of the same silhouette segment they are added to a map or list of pixel values for the segment. Hence, the computations described herein traces along the overall silhouette analyzing silhouette pixels along the way to either include or not include in a particular silhouette segment. The original silhouette pixel, unless it is as an endpoint, is then traced in a similar manner in the other direction until the opposite end of the silhouette is identified.

Before discussing the following operations in detail it should be noted that any particular silhouette pixel may represent some point along a particular silhouette segment, but not necessarily an end point of the silhouette. Hence, it is likely that the first silhouette pixel will have two neighboring silhouette pixels, and may have more than two. To begin generating a silhouette segment, one neighboring silhouette pixel is selected and the silhouette is traced until the end point of the silhouette segment is reached, at which point the process begins again with the other neighboring pixel and the silhouette is traced until the end point of the silhouette segment is reached, at which point the silhouette segment is complete. Processing then begins again with a new silhouette pixel, which would be considered the first silhouette pixel from the perspective of operation 410, and processing continuous until all silhouette pixels are assigned to a silhouette segment (operation 460). In the event the first silhouette pixel has three or more neighboring silhouette pixels, all neighbors are analyzed in accordance with the computations described below.

For example, referring to FIG. 3B, if a first silhouette pixel 60 is identified at a top portion of the rabbit's ear, the silhouette segment 46A is traced in a first direction (→) until it reaches a first endpoint 62. From the first pixel 60, the silhouette is then traced in a different direction, which may be opposite the direction (←) of the first tracing, until the silhouette reaches a second end point 64. Segment tracing will then proceed with a silhouette pixel from a different segment, noting that the silhouette pixels associated or traced for the first segment are no longer available for assignment to a different silhouette segment. In a similar manner, referring to the elephant in FIGS. 5B and 7B, when a silhouette pixel 66 is identified on the background ear silhouette segment 58, the tip of the background ear that is present is first traced in a first direction until a first endpoint 68 is identified, the background ear is then traced in a different direction until a second end point 70 is identified.

A second criteria that may be employed in assigning a neighboring silhouette pixel to a particular segment is curvature of the silhouette segment resulting from the possible assignment of the neighboring pixel to the segment (operation 420). In one example, a neighboring pixel that results in a lower curvature of the silhouette segment is prioritized over a different neighboring pixel that results in a greater curvature. Stated differently, the system favors neighboring silhouette pixels that result in silhouette paths with lower curvature in image-space (e.g., a neighboring silhouette pixel that is in a straight line in the tracing direction is favored over neighboring pixels that are not in a straight line). In one implementation, if the lowest curvature pixel meets the third and fourth criteria, it is assigned to the silhouette and the other neighboring pixels are not. If the lowest curvature pixel does not meet the third and fourth criteria, the analysis proceeds to each neighboring pixel based on curvature ranking until a pixel meets the third and fourth criteria or not. If not, the silhouette is considered at an end point.

Figure 6:
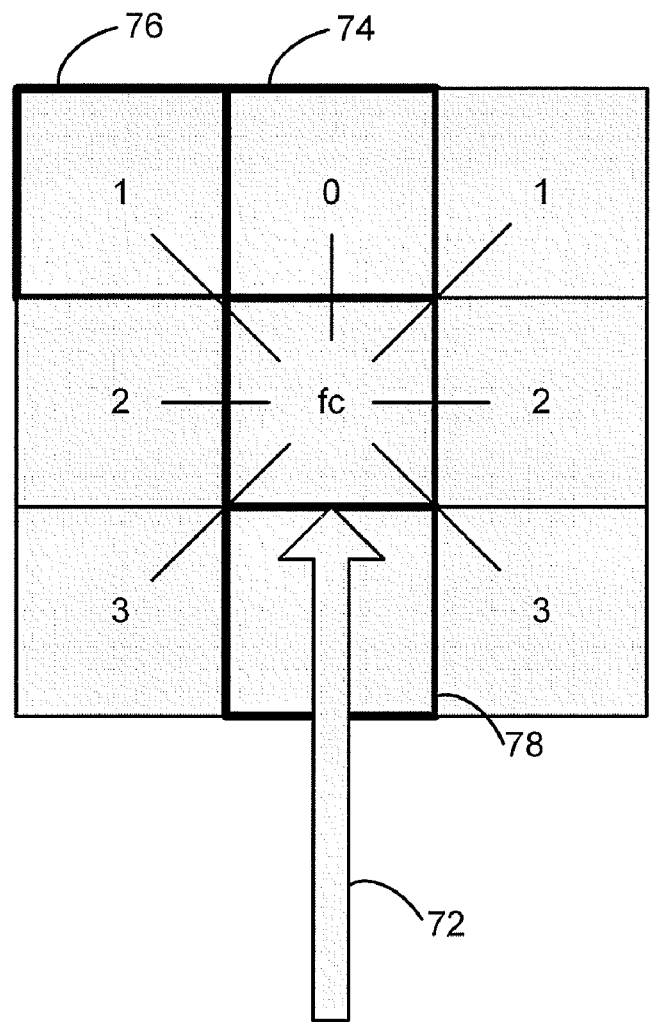
FIG. 6 is a diagram illustrating the priority ranking given to neighboring pixels of a current pixel fc based on the direction of silhouette tracing (arrow) in generating a silhouette segment.
Figure 7:
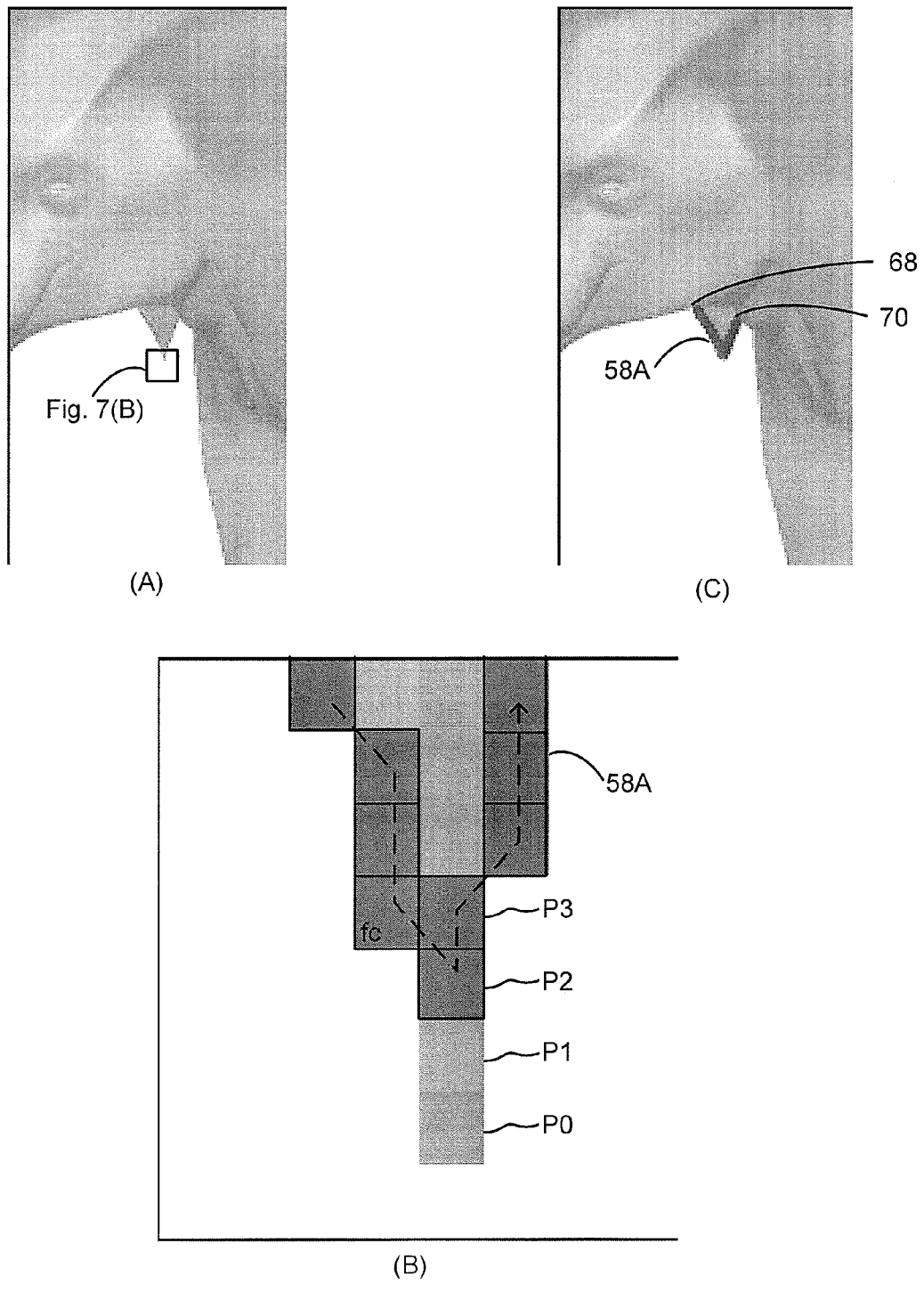
FIGS. 7A-7C illustrate silhouette segment selection taking into account curvature of neighboring silhouette pixels, and also illustrating removal of degenerate pixels.

For example, referring to FIG. 6, when tracing in the direction indicated by arrow 72, silhouette pixel fc has two neighboring pixels 74 and 76 (the silhouette pixels are outlined in bold), where silhouette pixel fc was assigned to the silhouette segment in a preceding operation. Referring to FIG. 6, for purposes of this portion of the discussion as well as others, the silhouette pixel fc (or current silhouette pixel) has already been assigned to the silhouette segment and is being compared to one or more neighboring pixels to determine if such pixels should be added to the silhouette segment. A neighboring pixel may be considered any possible silhouette pixel adjacent to the current silhouette pixel. In one implementation, however, a previously assigned pixel (to the silhouette segment), which is adjacent to the current pixel, will not be considered a neighboring pixel for purposes of priority ranking or assigning to the current or later silhouette segments. A given silhouette pixel may be assigned to one silhouette segment Further, the tracing direction, illustrated by arrow 72 in FIG. 6 and other figures, reflects the direction along the overall silhouette that pixels are being assessed for inclusion in the silhouette segment. Hence, the silhouette tracing direction is the direction from the pixel 78 added to the segment previous to the current pixel fc.

For purposes of priority ranking, referring again to FIG. 6, if all of the pixel locations illustrated are considered silhouette pixels, each neighboring pixel may be given a priority rating of 0 (0 degrees (straight, pixel 74), 1 (45 degrees, pixel 76), 2 (90 degrees), 3 (135 degrees). The pixel 78 at 180 degrees to the previous silhouette path or tracing direction, is already assigned to the silhouette path and is not available for assignment in this example. The priority rankings may be adjusted to suit any particular current pixel and tracing direction. The priority data may be implemented as a priority map relative to the direction of tracing. The priority map, however, is dynamic and is updated based on the current pixel and the direction of the silhouette segment being traced.

FIGS. 7A-7C illustrate a portion of the elephant illustrated in FIGS. 5A and 5B, and further illustrate the assignment of silhouette pixels to the lower background ear tip to define a silhouette segment for the ear tip, as well as other aspects of silhouette segment definition. More particularly, FIG. 7A illustrates the background image and a portion of the tip of the ear emphasize in FIG. 7B. FIG. 7B illustrates, with pixel locations highlighted by bolded boxes, silhouette pixels for a silhouette segment 58A for the background ear, silhouette pixels culled from the image, a tracing direction (dashed line) for the silhouette segment, and a current pixel fc referenced in the discussion below.

Referring to FIG. 7B, with reference to current pixel fc, neighboring pixel P2 has a 45 degree curve whereas pixel P3 has a 90 degree curve. Hence, pixel P2 is given a priority rating 1 and pixel 3 is given a lower priority rating 2. Thus, pixel P2 will be selected for inclusion in the silhouette segment over pixel P3, provided pixel P2 satisfies the other criteria. If the 45 degree pixel does not meet the other criteria, the system will next analyze the 90 degree pixel. In the example of FIG. 7B, it can be seen that pixel P2 is assigned to the silhouette.

Second, the system analyzes the adjacent or "neighboring" pixel in the silhouette map to determine if it is depth continuous (operation 430). Stated differently, the system determines if a neighboring pixel has a depth value substantially similar to the depth value of the current silhouette pixel (which may be the first pixel as discussed above) indicating continuity along the silhouette and hence being part of the silhouette segment or whether the neighboring pixel has a depth value that is not substantially similar indicating a discontinuity along the silhouette and hence a different silhouette segment. The discussion below provides one way to determine if a neighboring pixel has a similar depth value. Generally speaking, the analysis looks for pixels with a continuous depth value, not identical but indicative of silhouette pixel that is a part of the same feature as opposed to a pixel value with a discontinuous depth value indicative of being part of a different image feature and hence a different silhouette. Neighbors of the neighboring pixel are similarly compared and made a part of the silhouette, the process in a way tracing along the silhouette pixels and concatenating pixels to the silhouette segment.

In one particular implementation, two neighboring silhouette pixels a and b are depth continuous if:

$$\text{cont}(a,b) := \|\text{depth}(a) - \text{depth}(b)\| < \theta_n.$$

If the depth map was established as described above with regard to sil(p), $\theta_n \approx 0.1$ may be a good choice to consider adjacent pixels to be depth continuous and therefore part of the same silhouette, if the absolute value of their difference in depth is less than $\theta_n \approx 0.1$.

One particular complicating issue for generating silhouette segments involves silhouette pixel values with more than one neighboring pixels having a continuous depth value. Remember that the silhouette pixels form a path that could be wider than a single pixel (e.g., at silhouette intersections and where depth values are similar or identical), making the conversion to a depth conversion poly-line possibly ambiguous as a given neighboring pixel may be part of the current silhouette segment or part of a different silhouette segment. Some conventional approaches use the morphological operation of thinning to correct this problem by eliminating pixels. However, applying morphological operations on the binary silhouette image may result in silhouette paths that are continuous in 2D, but discontinuous in depth.

Figure 8:
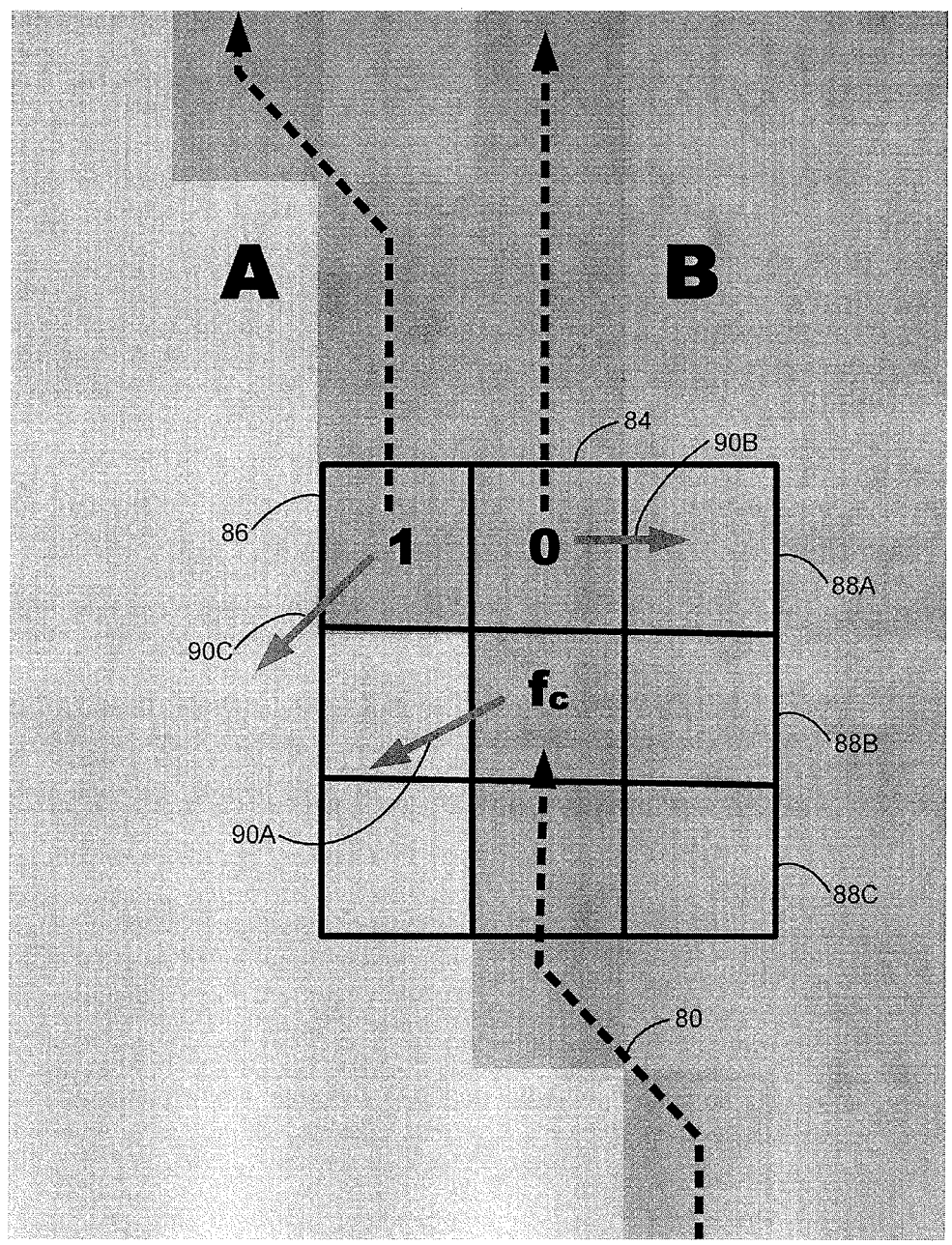
FIG. 8 is a diagram illustrating silhouette pixel segment selection of a neighboring pixel to a current pixel fc based on gradient.

A third criterion to consider in assigning a neighboring pixel to a silhouette segment, whether or not more than one neighboring pixel is present, is the gradient of the neighboring pixel. To explain the third criterion, reference is made to a different feature of the elephant. Referring now FIGS. 8-10, a silhouette path 80 from bottom and upward in FIG. 8 is shown and the pixel being analyzed is fc. The silhouette path is for the view of a lower portion 82 of the foreground elephant ear illustrated in FIGS. 9 and 10. It can be seen that a pixel 84 directly above fc (in the direction of the silhouette segment), has a priority rating of 0, and the pixel 86 to the left at 45 degrees, has a priority rating of 1, in the manner described above. Note, the pixels 88A-88C to the right are not silhouette pixels. Hence, in this example, there are two neighboring pixels of fc.

FIG. 8 further includes gradient arrows 90A-90C associated with each neighboring pixel and the current pixel. Neighboring pixel 86 has substantially the same gradient direction with respect to the current tracing direction as the current pixel fc. Hence, neighboring pixel 86 would be included in the silhouette segment over neighboring pixel 84 despite the higher priority rating of neighboring pixel 84.

Figure 9:
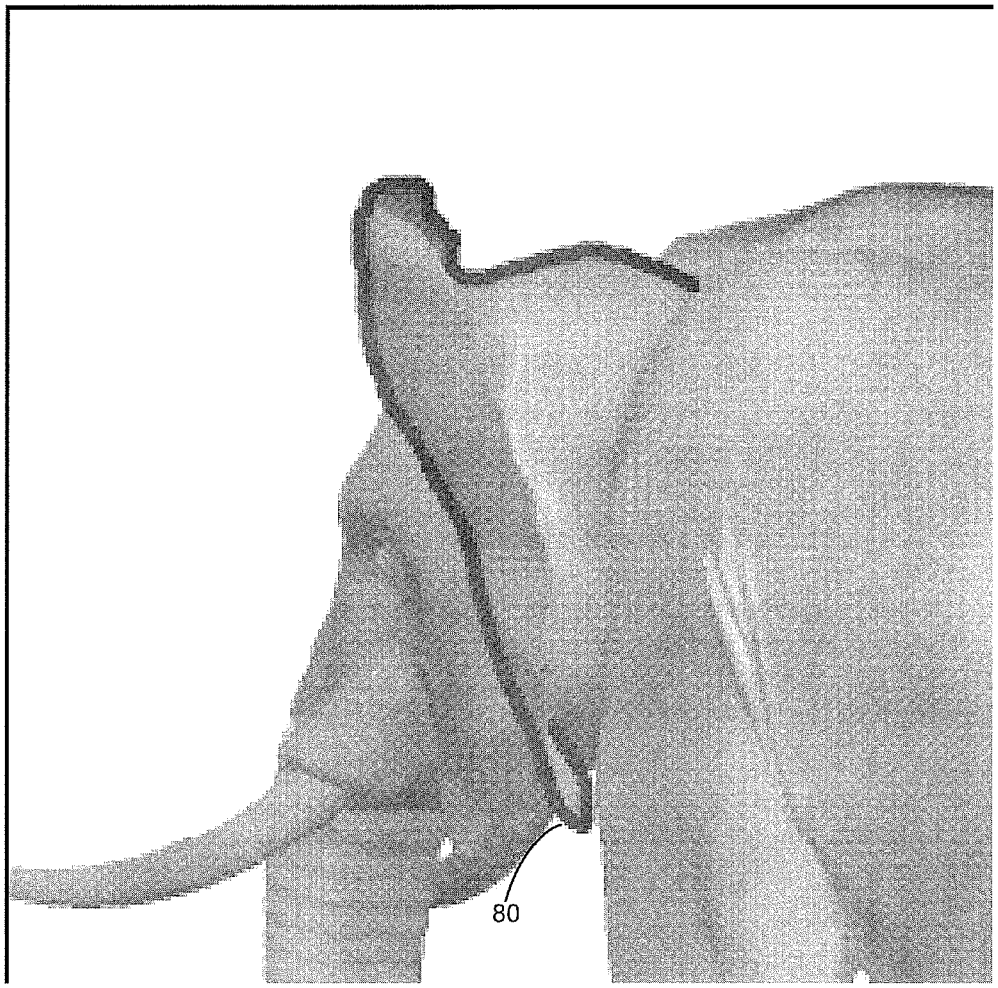
FIG. 9 is a diagram illustrating proper neighboring silhouette pixel selection based on gradient.
Figure 10:
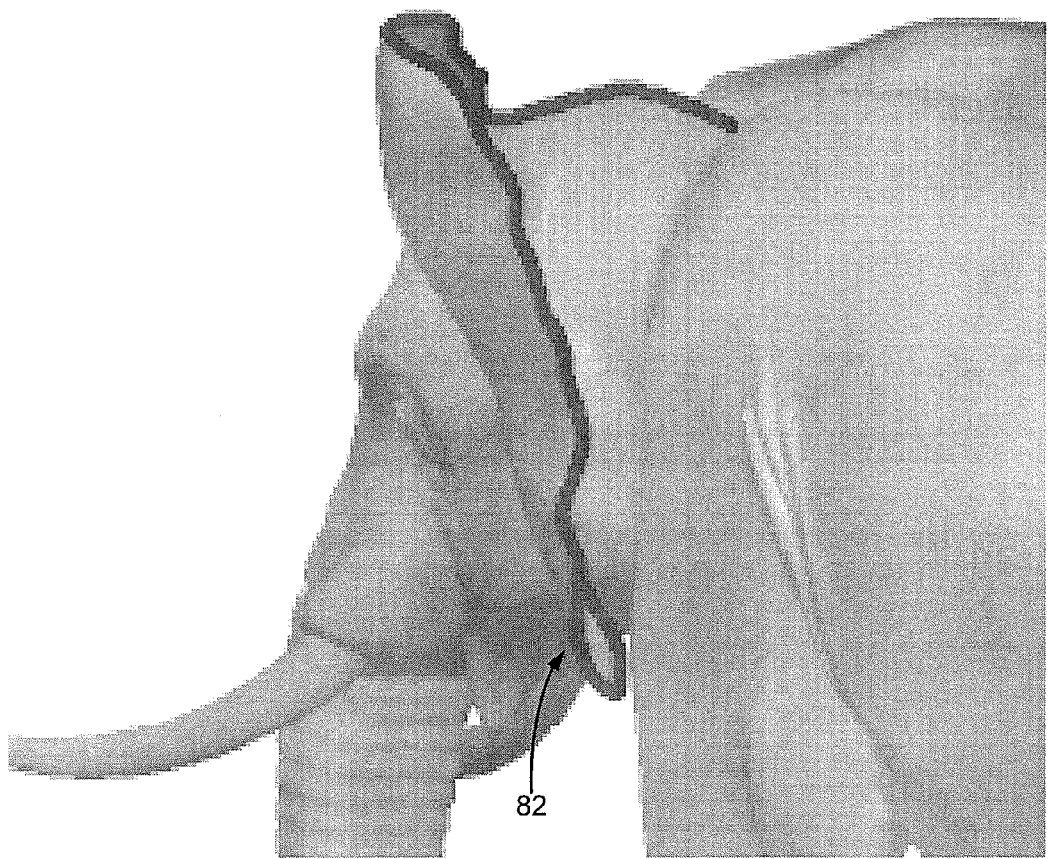
FIG. 10 is a diagram illustrating improper neighboring silhouette pixel selection when gradient is not considered, the silhouette tracing along an incorrect portion of a silhouette.

FIGS. 9 and 10 illustrate both proper and improper silhouette selection, with proper silhouette pixel selection 80 (FIG. 9) based on gradient and an improper silhouette selection (FIG. 10), which improper selection without consideration of gradient. In these examples, the silhouette is tracing upward from a lower portion of the ear and has reached pixel fc at an intersection of the front silhouette of the ear and the back silhouette of the ear. At this point, the path illustrated in FIG. 10 is the incorrect path, it reflects a switch from the front ear silhouette to the back ear silhouette. However, this is the path that would be taken if only the priority pixel criterion was used.

As discussed above, the gradient arrows 90A-90C associated with pixels fc, neighboring pixel 84 and neighboring pixel 86 illustrate the gradient of each pixel. The gradient reflects the depth value of each pixel in comparison to depth values of the pixels surrounding any given pixel.

In one implementation, gradient may be obtained as set forth as follows. Considering an image as a function, f(x, y) returns the pixel at pos (x, y) in that image. Gx and Gy are convolution filters similar to Lxy and related to f by returning approximations of gradients ($1^{st}$ derivative, or "strength of alteration") in the case of Gx/y, where Lxy returns summarized approximations of the $2^{nd}$ derivatives ("strength of the alteration of the alteration") of f.

The first derivative of f can be obtained by convolution kernels that compute the horizontal and vertical gradients, Gx and Gy, respectively, as follows:

$$G_x = \begin{bmatrix} 0 & 0 & 0 \\ -1 & 0 & 1 \\ 0 & 0 & 0 \end{bmatrix}, \quad G_y = \begin{bmatrix} 0 & 1 & 0 \\ 0 & 0 & 0 \\ 0 & -1 & 0 \end{bmatrix}.$$

Gradient direction θ is then defined by:

$$\theta = \arctan\left(\frac{G_x}{G_y}\right).$$

It is also possible to employ a Sobel operator to enhance the two dimensional gradient kernels by an implicit smoothing operation, where the gradient is computed by a weighted average over an 8-neighborhood to reduce any effects of noise:

$$S_x = \begin{bmatrix} -1 & 0 & 1 \\ -2 & 0 & 2 \\ -1 & 0 & 1 \end{bmatrix}, \quad S_y = \begin{bmatrix} 1 & 2 & 1 \\ 0 & 0 & 0 \\ -1 & -2 & -1 \end{bmatrix}.$$

When a neighboring silhouette pixel is assigned to a silhouette segment (operation 450) due to meeting the criteria of depth continuousness and gradient direction, some mechanism is employed to ensure that the silhouette pixel is not assigned to a different silhouette segment. In one implementation, silhouette pixels are simply eliminated from the silhouette map after assignment to a silhouette segment. In another example, silhouettes are marked within the silhouette map as being a part of a silhouette segment, and hence not available for subsequent assignment to a different silhouette segment.

If the neighboring pixels, whether one or more, do not meet the criteria of continuousness and gradient, then the silhouette segment is terminated and the process begins again either with assessment of the original pixel identified in operation 410 and tracing in a different direction with respect to a different neighboring pixel (operation 420) than the first time the original pixel was assessed (note, the first neighboring pixel identified meeting the criteria for depth continuity and gradient is eliminated, and hence the assessment will not simply retrace the same silhouette pixels), or other silhouette pixels that have not been assigned to a silhouette segment (operation 410). This process continues until all silhouette pixels are assigned to a silhouette segment. Referring again to FIG. 3B, it can be seen that that several distinct silhouette segments are generated for the rabbit, including a first silhouette segment for the foreground rabbit ear, a second silhouette for the background rabbit ear, a third silhouette for the rabbit's face, etc.

In some implementations, a preprocessing step of the silhouette map may be conducted to remove or otherwise delete degenerate silhouette pixels. Degenerate silhouette pixels are those pixels that if included in the silhouette map would result in the improper termination of generation of a silhouette segment. Hence, tracing of a silhouette and generation of the silhouette segment would terminate before the proper termination point resulting in an incomplete silhouette segment.

To avoid improper termination, tips of silhouettes may be deleted from the silhouette map. Examples of degenerate silhouette pixels may be found a tip of a silhouette, where one or more single pixels form a tip. In one example, a silhouette tip is considered any silhouette pixel that has less than two depth continuous neighbors. Hence, silhouette pixels are removed from the silhouette map that have less than two depth continuous neighbors. For example, referring again to FIG. 7B, pixel P0 is a silhouette pixel with one depth continuous neighbor, P1. Hence, P0 is removed from the map. After removal of P0, pixel P1 also has only one depth continuous neighbor, pixel P2, and hence P1 is also deleted from the map. Pixel P2, however, has two depth continuous neighbors, fc and P3, and so do the other silhouette pixels in FIG. 7B hence, no other pixels are deleted from the selection of pixels illustrated in FIG. 7B. The silhouette segment 58A is shown with the silhouette pixels P0 and P1 removed in FIG. 7C.

The removal of degenerate pixels may be performed on a pixel against all neighboring pixels, not only neighboring silhouette pixels, to identify pixels without two depth continuous neighbors. Such processing may be conducted on the image prior to the generate of the silhouette map using sil(p). With such processing, a silhouette terminating along a surface crease of the image will likely not be removed as the silhouette pixels, even the pixel at the end of the crease, will have depth continuous neighbors to one side or the other.

Referring again to FIG. 2, after the silhouette segments are generated, the system automatically matches the sketch input to a particular silhouette segment or portion of a silhouette segment (handle polyline) associated with feature intended for alteration based on sketch input (operation 220). So, for example, referring again to FIG. 3B silhouette segment 46A is shown around the background ear, the face, and down along the chest of the rabbit. However, referring to FIG. 3C, only a portion of the silhouette, the handle polyline 48, along the upper face of the rabbit to the nose is matched with the sketch input 36 above the face and nose of the rabbit. As mentioned above, the silhouettes segments may be considered polylines.

The polyline or portion of a polyline matched to the sketch input is referred to herein as a handle polyline.

To derive the handle polyline, the system employs estimation metrics that reflect the likelihood that a silhouette segment matches the user-sketch. The estimation may rely on proximity to the target polyline and similarity in shape to the target line in assessing whether a given silhouette segment is the handle polyline.

To begin, generation of a polyline delegate may include application of the Douglas Peucker algorithm (DP algorithm) as set forth in "Algorithms for the reduction of the number of points required to represent a line or its caricature," by David Douglas and Thomas Peucker, *published in The Canadian Cartographer* (10(2)): 112, 122 (1973), which is incorporated by reference. The DP algorithm reduces polyline complexity by culling pixels or other polyline points from the polyline according to a proximity criterion.

Figure 11:
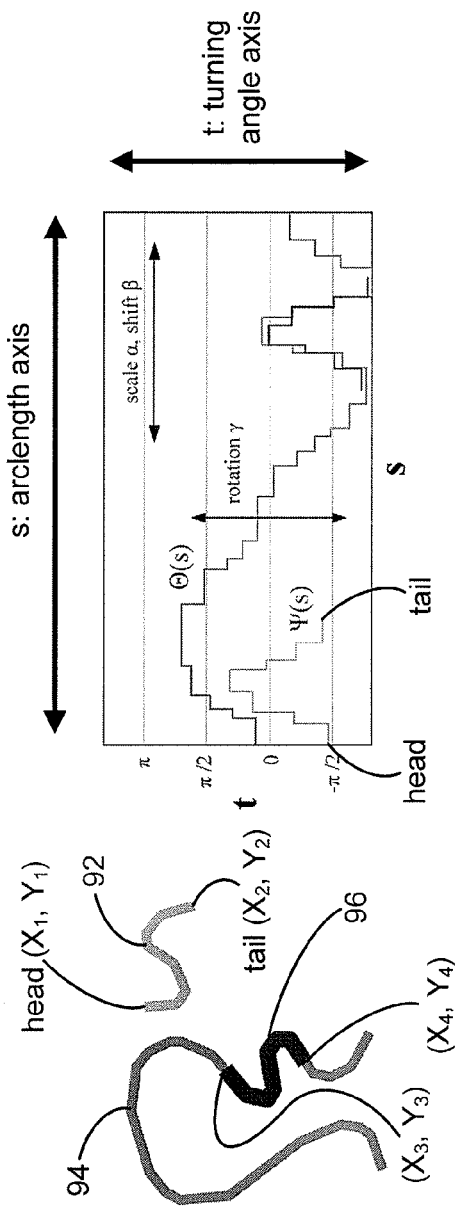
FIG. 11 is a diagram illustrating a method of matching a user sketch with a portion of a silhouette segment based on shape similarity.

After simplification of the silhouette polylines, the system matches one or a portion of one the simplified delegate polylines to the target polyline. As mention above, the system may match based on similarity in shape and proximity. First, with respect to similarity, the criterion on similarity is an adaptation implemented the Polyline Shape Search Problem (PSSP) described in "Partial Matching of Planar Polylines under Similarity Transformations" by Scott D. Cohen and Leonidas J. Guibas, *published in SODA: ACM-SAIM Symposium under Similarity Transformations* (1997), which is hereby incorporated by reference herein. First, with reference to FIG. 11 an example target polyline 92 and an example silhouette polyline 94 are shown. The system of the present disclosure computes turning angle summaries (TASs) $\{(s_0, t_0), (s_n, t_0)\}$ from the edges $\{e_0, \ldots e_n\}$ of the target and silhouette polylines by concatenating tuples of edge lengths $s_i$ and cumulative turning angles $t_i$, where:

$$s_i = \|e_i\|, \quad t_i = \begin{cases} \angle(e_0, 0) & \text{if } i = 0 \\ \angle(e_{i-1}, e_i) + t_{i-1} & \text{if } i > 0 \end{cases}$$

Please note that these turning angle summaries lack the representation of absolute coordinates, but they do retain a polyline arclength. Furthermore, rotating a polyline relative to its head (starting point) results in a shift of its TAS along the turning angle axis, whereas isotropic scaling results in stretching its TAS along the arclength.

The system then matches the target polyline onto a segment of the silhouette polyline, described by its (isotropic) scale and position (shift) β, by matching their Turning Angle Summaries. The match result $M_{PSSP}$: $(\alpha, \beta, \text{'Y}, R_{*mod})$ is described by a prescribed α, and β, an optimal rotation 'Y and the matching score $R_{*mod}$. Optimal rotation and matching score are computed by a modified version of the scoring function described. Using finite sums of differences, $I_1$ and $I_2$ describe the linear and squared differences between the piecewise constant TASs ψ (s) of the target and θ (s) of the silhouette polylines (FIG. 4.4):

$$I_1(\alpha, \beta) = \int_{s=\beta}^{\beta+\alpha} \left( \Theta(s) - \Psi\left(\frac{s-\beta}{\alpha}\right) \right) ds,$$

$$I_2(\alpha, \beta) = \int_{s=\beta}^{\beta+\alpha} \left( \Theta(s) - \Psi\left(\frac{s-\beta}{\alpha}\right) \right)^2 ds.$$

Given the arclength I of the target polyline, we compute optimal rotation $$\gamma = \gamma_*(\alpha, \beta) = \frac{I_1}{\alpha l},$$

and matching score $$R_{*mod}(\alpha, \beta) = \frac{1}{\alpha l} \left( \frac{I_2(\alpha, \beta)}{\alpha l} - \left( \frac{I_1(\alpha, \beta)}{\alpha l} \right)^2 \right).$$

Cohen and Guibas retrieve matches for all segments (α, β,) by using a topological sweep algorithm to match the respective Turning Angle Summaries in scale/position space. However, while workable, since this approach needs $O(m^2n^2)$ time for m silhouette edges and n target edges, the system also be configured to employ an adaptation of the Cohen and Guibas disclosure. Namely, the system may probe only a discrete number of sample segments in Eqn. 4.6 in O(m+n) time per segment. Specifically, the system may match the target polyline to sample segments of a silhouette polyline by discretely sampling α and β respectively, which significantly improves the speed of processing compared to an approach using the Cohen and Guibas disclosure, but does not sacrifice accuracy to a significant degree.

For the proximity criterion, the system computes the distances of corresponding endpoints of the target polyline and the delegate silhouette polyline being compared retrieving a near and far value $Prox_{near}$, $Prox_{far}$. The target polyline includes two endpoints (head and tail) denoted by (X1, Y1) and (X2, Y2). Similarly, the delegate polyline being compared includes two endpoints denoted by (X3, Y3) and (X4, Y4). Proximity is determined by calculating the distances between corresponding endpoints of the two polylines, in one example through the following:

$Prox_{1,3}$=squareroot($(X1-X3)^2+(Y1-Y3)^2$)

$Prox_{2,4}$=squareroot($(X2-X4)^2+(Y2-Y4)^2$)

$Prox_{near}$=minimum($Prox_{1,3}$,$Prox_{2,4}$)

$Prox_{far}$=maximum($Prox_{1,3}$,$Prox_{2,4}$)

Only comparing the endpoints of the handle and silhouette polylines allows the overall editing processing to proceed more quickly than if additional point distances were compared. It is possible, nonetheless, to compare distances of other polyline pixels, which may improve accuracy of the overall matching operation.

Finally, in selecting a handle polyline, the system applies a final scoring function on the obtained per-silhouette match results:

$$R := 1/(1+w_1 \text{Prox}_{near}+w_2 \text{Prox}_{far}+w_3 R_{*mod})^2$$

The R ranking may include weighting criteria for the proximity values as well as the shape similarity value. In one particular implementation, proximity is given higher weighting and hence higher influence on the ranking, with w1=0.4, w2=0.4, and w3=0.2.

Iterating over all silhouettes, the system select the polyline delegate segment with the highest score, which is the handle polyline. The system further extracts the deformation handle from the respective full resolution silhouette map by using ($\alpha$, $\beta$) of its matching record $M_{PSSP}$. Given scale $\alpha$ and shift $\beta$, it creates the handle polyline from the full resolution silhouette by extracting all pixels/points (X, Y, depth) beginning at the position given by arclength $\beta$ up to the position arclength $\beta+\alpha$*arclength (user-sketch).

With the handle polyline and the target polyline, the system next determines the mesh vertices that correspond with the handle polyline (operation 230). Up to this point, the system was operating on image space data, data that may be considered as presented in two dimensions, and has matched the sketched target polyline with the object being edited by way of the handle polyline, both polylines being two dimensional representations. The image space view of the object may also be considered a proxy image. The system now transforms the two dimensional space to the three dimensional space by matching the handle polyline with mesh vertices, or other mesh features, of the object. The system may transform the mesh positions based on the distance between handle polyline and the target polyline. Hence, the system translates the match between target and handle polylines to the three dimensional object space (the actual or mesh view) so that deformation of the three dimensional object may proceed.

In one particular implementation, the system identifies portions of the mesh of the object being edited with the handle polyline, and then deforms the mesh based on the separation of the sketch from the handle and based on the form of the sketch compared to the handle.

Figure 12:
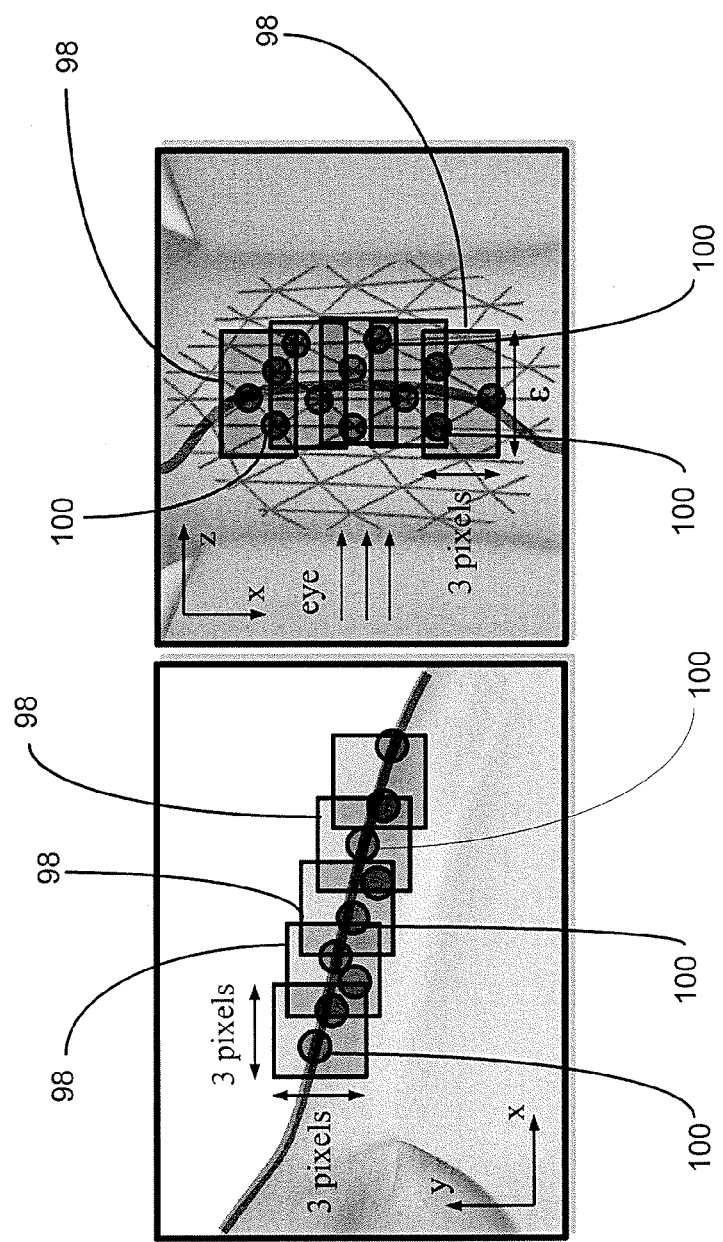
FIG. 12 is a diagram illustrating bounding volumes of silhouette handle pixels used to identify handle vertices in a computer graphic object mesh.

To begin, using both the image-space handle polyline pixels as well as the corresponding depth map for the pixels, the system constructs an object-space bounding volume 98 for each handle pixel (each pixel in the handle polyline), as illustrated in FIGS. 12A and 12B. FIGS. 12A and 12B illustrate a plurality of silhouette pixels for a handle polyline, with FIG. 12A further illustration x and y dimensions of the bounding volumes 98 and FIG. 12B illustrating X and Z dimensions of the bounding volumes 98. Any vertexes 100 of the computer graphic feature within a bounding volume is identified or otherwise classified as a handle vertex.

In one example, for each handle polyline pixel, a cubical bounding volume is constructed. The cubical is three x pixels tall, and three y pixels wide, with the handle polyline pixel at the center x and y position. Stated differently, the x-dimension of the handle pixel is extended by x+1 and x−1, and similarly the y-dimension of the handle pixel is extended by y+1 and y−1. A z-dimension value, epsilon (E) illustrated in FIG. 12B, accounting for the depth dimension may be a user-defined threshold that defines the extents of the cubical bounding volumes in depth. Thus, the depth range of a cubical bounding volumes is (near, far)=[handle pixel depth value— epsilon, handle pixel depth value+epsilon]. In one particular implementation, we found that epsilon=0.01 yields reasonable results, assuming that the depth map is set up as described before.

All vertices 100 of the mesh falling within the constructed handle pixel cube are considered handle vertices. This process is repeated for each handle polyline pixel resulting in a set of handle vertices of the three dimensional object that correspond with the handle polyline. While bounding volumes are not required, one benefit of the notion of a bounding volume stem from the fact that vertices are typically floating point values whereas pixels are integer values. Hence, the bounding volume introduces some tolerance to capture vertices that may have been altered in floating point space due to rasterization, projection, or otherwise, and hence might not be matched to the handle pixel otherwise.

Figure 13:
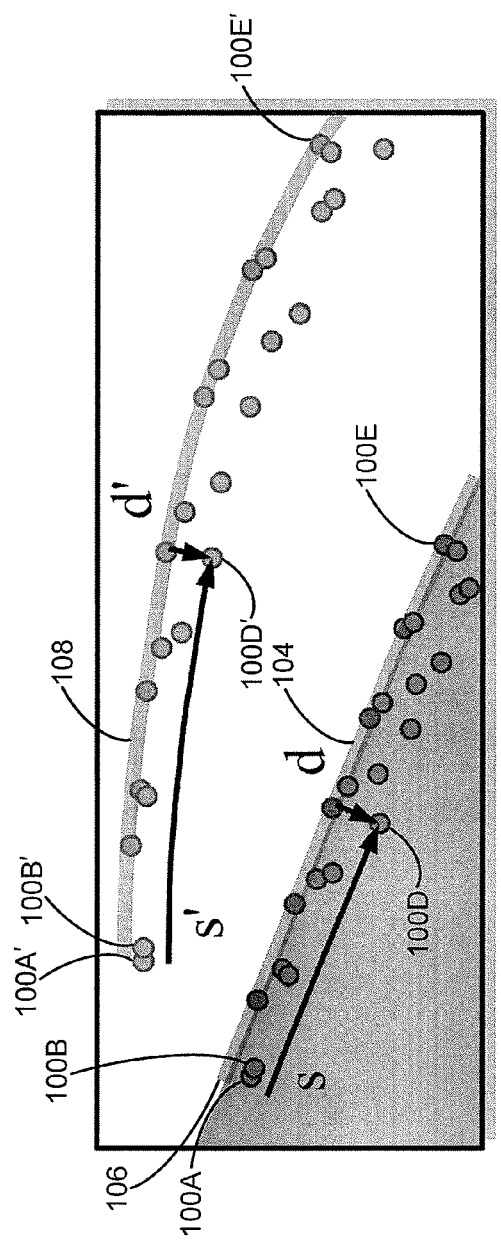
FIG. 13 is a diagram illustrating handle vertices and transformed handle vertices.

Once the handle vertices are identified, they are transformed to relative positions on the target polyline. FIG. 13 illustrates a plurality of handle vertexes 100 A-100E and their relative positions 100A'-100E' to the handle polyline. Each handle vertex may be characterized by a displacement d from the handle polyline 104 and an arclength position s from an endpoint 106 of the handle polyline 108. Specifically, the system determines the position (s, d) for each handle vertex, where the arclength position s is given by its orthogonal projection of length d. A scaling factor may be derived based on the ratio of the arclength of the target polyline to the arclength of the handle polyline. Based on the scaling factor, the handle vertex positions are transformed or mapped to target vertex positions. Both handle and target polylines are parameterized uniformly in [0, 1] and the target position (s', d') is scaled accordingly. In one implementation, uniform parametrization indicates that positions along the polyline are described by a relative position (parameter) $\text{pos}_{rel}$ between (including) 0 and 1, such that the absolute position is given by: $\text{pos}_{abs}=\text{pos}_{rel}$*arclength(polyline). $\text{pos}_{rel}=0$ refers to the starting point (head) of the polyline, and $\text{pos}_{rel}=1$ to its tail (end).

To complete the deformation setup, the system may select the final region of interest (ROI) of the mesh according to a context sensitive criterion (operation 240). The ROI is an area, including the handle vertices and other vertices that is edited according to the target polyline. For example, referring to FIG. 3D, an area of the rabbit's face is the ROI. The ROI is defined, in part, on the handle vertices and the respective transformed handle vertices. To control the expansion, the system, in one example, constrains the ROI to lie within a union of bounding volumes with a bounding volume for each handle vertex. Since the editing algorithm, which may be a Laplacian Surface Editing (LSE) function as described below, may be constrained to edit vertices to the ROI that lie within this union of spheres, the union of spheres may define the maximum extents of the ROI. Thus, the alteration of the ROI is controlled by this union of spheres.

To illustrate the ROI and union of spheres aspects, FIGS. 14A-14D illustrate editing operations for the face of a camel graphical object. Specifically, the system generates a union of spheres or set of spheres, with each sphere center located at the position of the respective handle vertex. Each sphere radius is set to the Euclidean distance $d_h$, between a given handle vertex 110A-D and its transformed position 112A-D. The sphere radius may also be computed by other, more or less complicated functions, such as $r_s=f(d_{h,s})$. Nonetheless, the Euclidean distance may be calculated efficiently and yields. It should be noted, that when the user sketch is far from the handle, using a larger sphere results in a larger ROI, yielding more deformable material, which is considered a reasonable heuristic. FIG. 14B illustrates four spheres 118A-

118D of increasing radius reflecting the increasing radius between 110A-112A, 110B-112B, etc.

An ROI, denoted by dashed line 114 in FIG. 14C, then may define the handle vertices to be the initial ROI vertex set, and grow this set by subsequently adding vertices of the mesh that are (a) adjacent to the current ROI border, and (b) are inside the union of spheres. The ROI border 116 is the area of vertices within the ROI adjacent those vertices not within the ROI. The vertices adjacent but not within the ROI may be considered anchor vertices. These vertices are not transformed, in later operations. Anchor vertices may be identified by extending the ROI by a given number of vertex rings, the vertices falling within a ring begin considered anchor vertices.

Figure 14:
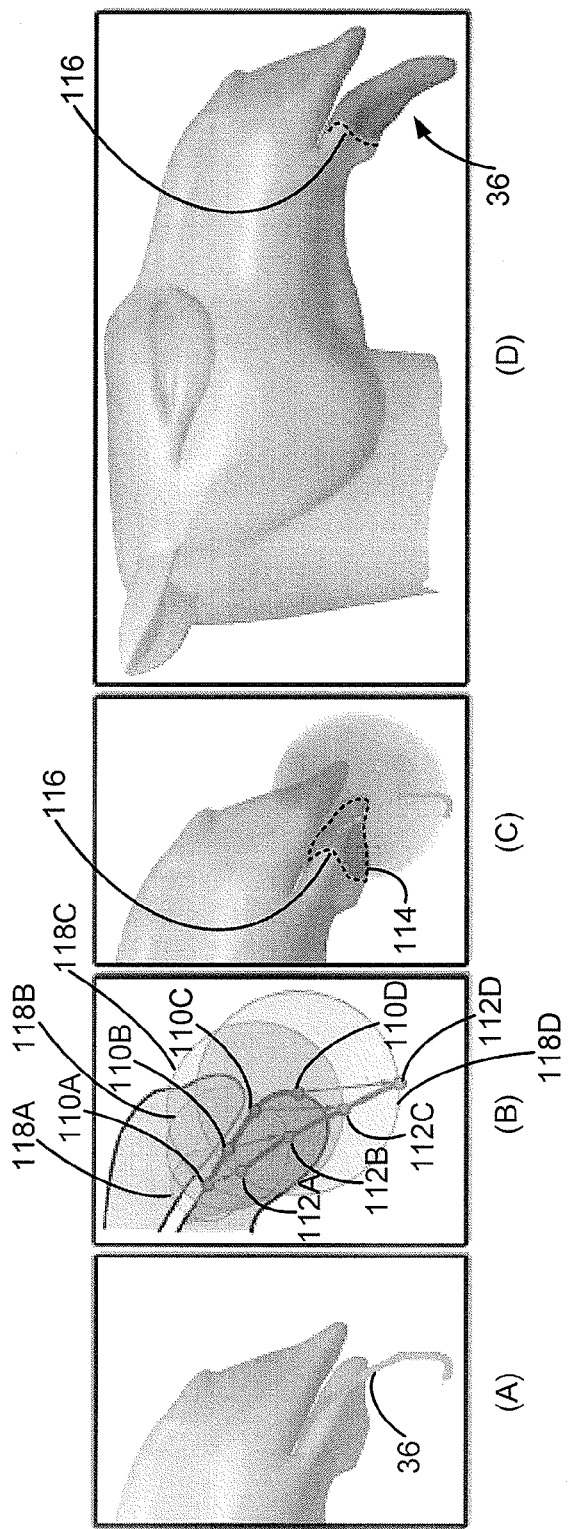
FIGS. 14A-14D are diagrams illustrating mesh deformation automatically generated based on a user sketch input into a computer graphic modeling program in proximity to a feature that the user seeks to alter.

Hence, the system provides a region of interest in the way of a subset of all possible vertices of the three dimensional graphic object. In one example, the ROI is provided as an input to an LSE arrangement. While LSE is one possible editing implementation, the ROI may be an input to other editing or deformation platforms as well. FIG. 14 illustrates a deformation of the vertices in the region of interest proportional to the separation between the handle vertices 110 and the transformed vertices 112.

LSE arrangements that may accept ROI definitions as set forth herein and edit or otherwise deform a computer graphic object are set forth in "Laplacian Surface Editing," O. Sorkine et al, *Proceeding of Eurographics/ACM SIGGRAPH Symposium on Geometry Processing*, pgs. 179-188 (2004), which is hereby incorporated by reference herein. Generally speaking, LSE computes new coordinates for all ROI vertices, i.e., deformation vertices. The positions of vertices at the border of the ROI are retained, and the anchor vertices may be considered static vertices. In one implementation, handle vertices are positionally extended to meet the target vertices, and the surface detail (defined by vertex Laplacians) in the ROI is preserved. The disclosure of LSE is that this deformation may be computed by formulating constraints on vertex Laplacians of the ROI, target positions of the handle vertices, and positions of the static anchor vertices as a system of linear equations, which may be solved in a least squares sense using the method of normal equations. LSE may take as inputs positions of ROI vertices, edges between ROI vertices (adjacencies/connectivity of the ROI vertices), anchor vertices, and handle vertices with target positions. Anchor and handle vertices are a subset of the ROI. Anchor vertices stitch the deformed ROI to the remaining (undeformed) mesh.

It should be recognized that various aspects of the present disclosure, such as the particular method of establishing silhouettes discussed with reference to FIG. 4, may be used in applications besides alteration of a computer graphic object. Further, such alternative employments may be done in conjunction with computer modeling programs requiring some manual intervention by a user. Hence, while editing computer graphic objects is certainly one aspect of the present disclosure, other unique implementations are also possible. Aspects of the present disclosure are related to "MeshSketch: Automated, Sketch-Based Editing of Triangular Meshes" by Johannes Zimmermann (#187295), which is hereby incorporated by reference herein.

Embodiments within the scope of the present invention also include computer-readable media for carrying or having computer-executable instructions or data structures stored thereon. Such computer-readable media may be any available media that can be accessed by a general purpose or special purpose computer such as the processing elements of the system of FIG. 1. By way of example, and not limitation, such computer-readable media can comprise RAM, ROM, EEPROM, CD-ROM, DVD, or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention claimed is:

1. A method of preparing a three dimensional computer graphic object for deformation comprising:

receiving a user generated sketch proximate a feature of a two dimensional view of a three dimensional computer graphic object, wherein the three dimensional computer graphic object includes one or more mesh geometry data files and the two dimensional view includes an associated image map including an array of pixel values for the two dimensional view and a depth map of depth values for the array of pixel values, wherein the depth values are used to determine discontinuities in the object and the mesh geometry data files include a plurality of mesh features;

generating a silhouette map for the two dimensional view of the three dimensional graphic, the silhouette map including substantially all pixel values on silhouette lines of the two dimensional view;

generating a plurality of silhouette segments, with each silhouette segment comprising a subset of all silhouette pixel values in the silhouette map, wherein generation of each silhouette segment considers at least one of the following criterion for inclusion of a pixel in the segment relative to other pixels in the segment: curvature in image space, depth continuity and a direction of a depth map gradient; and matching the user generated sketch with the feature of the two dimensional view, wherein matching the user generate sketch with the feature of the two dimensional view comprises:

transforming the matched feature of the two dimensional view to a representation of the feature associated with the three dimensional computer graphic object;

matching the user generated sketch to all or a portion of one of the plurality of silhouette segments; and reducing a number of pixel positions associated with a polyline representation of the portion the one of the plurality of silhouette segments, the polyline representation including a plurality of handle pixel positions after reduction;

associating the handle pixel positions with corresponding handle mesh features from the plurality of mesh features, the set of mesh features being associated with the one or more of the plurality of features, and generating object space bounding volumes for the handle pixel positions, the object space bounding volumes encompassing handle vertices for each mesh feature encompassed in the bounding volumes.

2. The method of claim 1 further comprising generating a union of spheres associated with the handle vertices.

3. The method of claim 2 further comprising defining a region of interest encompassing the handle vertices and a number of other vertices of a plurality of vertices of the triangular mesh.

4. The method of claim 1 further comprising deforming the representation of the feature of the three dimensional view, proportional to separation between the user generated sketch and the matched feature.

5. The method of claim 4 further comprising providing a user interface for receiving the user generated sketch with respect to the two dimensional view of the three dimensional computer graphic object, the two dimensional view displayed on the user interface.

6. The method of claim 1 further comprising generating the silhouette map using a four neighborhood Laplacian edge detection filter applied against each pixel in the two dimensional view pixel array, the filter:

$$\mathrm{sil}(p) := L_{xy}[\mathrm{depth}(p)] > \theta_p.$$

7. The method of claim 1 wherein the silhouette map includes at least a first silhouette pixel having a first depth value and an adjacent second silhouette pixel having a second a depth value, the operation of generating a plurality of silhouette segments further comprising determining whether a difference between the first depth value and the second depth value is less than a second threshold value.

8. The method of claim 7 wherein the first pixel is a current pixel assigned to one of a plurality of silhouette segments and further comprising an adjacent third silhouette pixel, the operation of generating a plurality of silhouette segments further comprising identifying a direction of the one of the plurality of silhouette segments and prioritizing the adjacent second and third silhouette pixels for inclusion in the one of the plurality of silhouette segments based on the direction of the silhouette pixel.

9. The method of claim 8 wherein the current pixel value has a first depth map gradient value, the second adjacent silhouette pixel has a second depth map gradient value of a substantially similar orientation of the first depth map gradient value, the third adjacent silhouette pixel has a third depth map gradient value of a substantially different orientation as the first and second depth map gradient values, the operation of generating a plurality of silhouette segments further comprises assigning the second silhouette pixel to the one of the plurality of the silhouette segments.

10. The method of claim 1 further comprising iteratively removing all silhouette pixels with less than two depth continuous adjacent pixels.

11. The method of claim 1 further comprising matching the user generated sketch to all or a portion of one of the plurality of silhouette segments.

12. The method of claim 11 further comprising reducing a number of pixel positions associated with a polyline representation of the portion the one of the plurality of silhouette segments, the polyline representation including a plurality of handle pixel positions after reduction.

13. The method of claim 12 wherein the mesh geometry data files include a plurality of mesh features, the operation of matching further comprising associating the handle pixel positions with corresponding handle mesh features from the plurality of mesh features, the set of mesh features being associated with the one or more of the plurality of features.

14. The method of claim 13 wherein the plurality of handle mesh features are handle mesh vertices of a triangular mesh.

15. The method of claim 14 further comprising automatically deforming the three dimensional computer graphical object including the vertices within the region of interest consistent with the user generated sketch.

16. The method of claim 1 wherein said operation of matching the user generated sketch to all or a portion of one of the plurality of silhouette segments further comprises matching all or a portion of one of the plurality of silhouette segments to the user generated sketch based on proximity between the user generated sketch and the all or a portion of one of the plurality of silhouette segments and similarity of shape between the user generated sketch and the all or a portion of one of the plurality of silhouette segments.

17. A method of deformation for a computer graphic object comprising:
    providing a proxy image of the computer graphic object, the proxy image including a plurality of image features;
    receiving a user generated sketch proximate at least one of the image features;
    identifying at least one of the image features of the plurality image values of the proxy image by matching the user generated sketch with the at least one image feature, the operation of identifying at least one of the image features of the plurality image values of the proxy image comprising obtaining at least one silhouette map of the proxy image, wherein the silhouette map comprises a plurality of silhouette pixels and an associated depth map of depth values for each of the plurality of silhouette pixels, wherein the depth values are used to determine discontinuities in the object;
    transforming the feature image values of the proxy image to corresponding object feature values of the computer graphic object, wherein the operation of identifying at least one of the image features of the plurality image values of the proxy image by matching the user generated sketch with the at least one image feature further comprises beginning with one of the plurality of silhouette pixels, tracing a portion of the silhouette map to identify silhouette pixels based on curvature, depth continuity and depth gradient, all such silhouette pixels forming a silhouette segment, wherein the silhouette segment comprises adjacent pixels having at least one of a common curvature in image space, a depth continuity or a direction of a depth map gradient correlating to a current tracing direction;
    matching at least a portion of the silhouette segment to the user generated sketch based on proximity between the user generated sketch and the at least a portion of the silhouette segment and similarity of shape between the user generated sketch and the at least a portion of the silhouette segment, wherein the operation of transforming the feature image values of the proxy image to corresponding object feature values of the computer graphic object comprises transforming the least a portion of the silhouette segment to at least one handle vertex position of a mesh, the vertex positions corresponding to the feature image values of the proxy image;
    obtaining altered vertex position locations corresponding to the handle vertex positions, the altered vertex position locations based on a displacement between a plurality of pixel locations corresponding with the user generated sketch and the plurality of pixel positions between the portion of the silhouette segment; and
    generating a region of interest of the computer graphic object, the region of interest comprising at least all vertex positions of the mesh to positionally modify based on the user generated sketch.

18. The method of claim 17 further comprising positionally modifying the region of interest of the computer graphic object using Laplacian Surface Editing.

19. The method of claim 17 wherein the operation of transforming the feature image values of the proxy image to corresponding object feature values of the computer graphic object comprises transforming the least a portion of the silhouette segment to at least one handle vertex position of a mesh, the vertex positions corresponding to the feature image values of the proxy image.

20. The method of claim 19 further comprising obtaining altered vertex position locations corresponding to the handle vertex positions, the altered vertex position locations based on a displacement between a plurality of pixel locations corresponding with the user generated sketch and the plurality of pixel positions between the portion of the silhouette segment.

* * * * *